(12) United States Patent
Saruki et al.

(10) Patent No.: US 8,232,795 B2
(45) Date of Patent: Jul. 31, 2012

(54) MAGNETIC SENSOR

(75) Inventors: Shunji Saruki, Tokyo (JP); Hiraku Hirabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 275 days.

(21) Appl. No.: 12/816,725

(22) Filed: Jun. 16, 2010

(65) Prior Publication Data
US 2011/0031965 A1  Feb. 10, 2011

(30) Foreign Application Priority Data
Aug. 7, 2009  (JP) ................ 2009-185167

(51) Int. Cl.
G01B 7/14 (2006.01)
G01B 7/30 (2006.01)

(52) U.S. Cl. .......... 324/207.25; 324/207.12; 324/207.21

(58) Field of Classification Search ............ 324/207.25, 324/207.21, 207.12
See application file for complete search history.

(56) References Cited

U.S. PATENT DOCUMENTS
6,633,462 B2  10/2003  Adelerhof
6,943,544 B2  9/2005  Waffenschmidt
2002/0105445 A1  8/2002  Shirai et al.
2009/0206827 A1  8/2009  Aimuta et al.

FOREIGN PATENT DOCUMENTS
EP  1 544 580 A2  6/2005

OTHER PUBLICATIONS

Extended Search Report issued in European Patent Application No. 10167105.5 dated Dec. 12, 2011.

Primary Examiner — Reena Aurora
(74) Attorney, Agent, or Firm — Oliff & Berridge, PLC

(57) ABSTRACT

A magnetic sensor includes a first detection unit and a second detection unit. The first detection unit calculates a first detection angle which is a detected value of a first angle that a direction of an external magnetic field in a first position forms with respect to a first direction. The second detection unit calculates a second detection angle which is a detected value of a second angle that the direction of the external magnetic field in a second position forms with respect to a second direction. The first detection angle includes a first angular error. The second detection angle includes a second angular error. The first angular error and the second angular error differ in phase by an odd number of times ½ of the error period.

17 Claims, 23 Drawing Sheets

MAGNETIC SENSOR

BACKGROUND OF THE INVENTION

1. Field of the Invention

The present invention relates to a magnetic sensor for detecting an angle that the direction of an external magnetic field forms with respect to a reference direction.

2. Description of the Related Art

In recent years, magnetic sensors have been widely used to detect the rotational position of a target object in various applications such as detecting the rotational position of an automotive steering wheel. Linear encoders for detecting a linear displacement of a target object also use magnetic sensors. Systems using such a magnetic sensor are typically provided with means (for example, a magnet) for generating an external magnetic field that rotates in direction in conjunction with the rotation or linear movement of the target object. The magnetic sensor detects the angle that the direction of the external magnetic field forms with respect to a reference direction. The rotational position or linear displacement of the target object is thus detected.

There have been known magnetic sensors that have two bridge circuits (Wheatstone bridge circuits) as shown in U.S. Pat. No. 6,943,544, U.S. Pat. No. 6,633,462, and U.S. Patent Application Publication No. 2009/0206827 A1. In such magnetic sensors, the two bridge circuits each include four magnetoresistive elements (hereinafter, referred to as MR elements). Each bridge circuit detects the intensity of a component of the external magnetic field in one direction, and outputs a signal that indicates the intensity. The output signals of the two bridge circuits differ in phase by ¼ the period of the output signals of the respective bridge circuits. The angle that the direction of the external magnetic field forms with respect to a reference direction is calculated based on the output signals of the two bridge circuits.

When the magnetic sensor using MR elements lies in an external magnetic field that rotates in direction, the waveforms of the output signals corresponding to the resistances of the MR elements ideally trace sinusoidal curves (including both sine and cosine waveforms). As described in U.S. Pat. No. 6,633,462, however, it is known that the output signal waveforms of the MR elements are sometimes distorted from the sinusoidal curves. The distortion of the output signal waveforms of the MR elements can cause an error in the angle detected by the magnetic sensor. The major causes for the distortion of the output signal waveforms of the MR elements are broadly classified into one ascribable to the MR elements and one ascribable to the external magnetic field.

Now, examples of the situation where the output signal waveforms of the MR elements are distorted due to the MR elements will be described for cases where the MR elements are giant magnetoresistive (GMR) elements or tunneling magnetoresistive (TMR) elements. GMR elements and TMR elements each have a magnetization pinned layer whose direction of magnetization is pinned, a free layer whose direction of magnetization varies with the direction of the external magnetic field, and a nonmagnetic layer disposed between the magnetization pinned layer and the free layer. One of the examples where the output signal waveforms of the MR elements are distorted due to the MR elements is when the direction of magnetization of the magnetization pinned layer varies due to the influence of the external magnetic field or the like. Such a situation is likely to occur when the external magnetic field has a relatively high intensity. Another example where the output signal waveforms of the MR elements are distorted due to the MR elements is when the direction of magnetization of the free layer does not coincide with the direction of the external magnetic field due to such factors as the shape anisotropy and coercivity of the free layer. Such a situation is likely to occur when the external magnetic field has a relatively low intensity.

On the other hand, one of the examples where the output signal waveforms of the MR elements are distorted from a sinusoidal curve due to the external magnetic field is when the direction of the external magnetic field or the intensity of a component of the external magnetic field in one direction makes no sinusoidal change. Such a situation is likely to occur when detecting the direction of the external magnetic field occurring from the outer periphery of a rotating body that has one or more pairs of N and S poles arranged alternately in an annular configuration, or when detecting the direction of the external magnetic field occurring from the outer periphery of a moving body that has a plurality of pairs of N and S poles arranged alternately in a linear configuration and moves in the direction of arrangement of the N and S poles.

U.S. Pat. No. 6,633,462 discloses a magnetoresistive sensor in which a main detection element having a main reference magnetization axis is electrically connected with two corrective detection elements each having a reference magnetization axis oblique to the main reference magnetization axis, so that the detection angle is corrected. The sensor, however, requires that the corrective detection elements be optimized in design according to various design conditions including the resistances, size, and materials of the main detection element and the corrective detection elements as well as the intensity of the external magnetic field. This causes the problem of difficulty in designing the sensor.

The description so far has been given of the problem that a magnetic sensor that uses MR elements can cause an error in the angle detected by the magnetic sensor. Nevertheless, such a problem applies to all magnetic sensors that detect the angle the direction of an external magnetic field forms with respect to a reference direction.

OBJECT AND SUMMARY OF THE INVENTION

It is an object of the present invention to provide a magnetic sensor that detects the angle that the direction of an external magnetic field forms with respect to a reference direction, the magnetic sensor being capable of reducing an error in the angle detected.

Each of a first and a second magnetic sensor of the present invention detects an angle that a direction of an external magnetic field in a reference position forms with respect to a reference direction, the external magnetic field rotating in direction. Each of the first and the second magnetic sensor includes: a first detection unit for detecting a first angle that the direction of the external magnetic field in a first position forms with respect to a first direction; and a second detection unit for detecting a second angle that the direction of the external magnetic field in a second position forms with respect to a second direction.

The first detection unit includes first and second detection circuits each of which detects an intensity of a component of the external magnetic field in one direction and outputs a signal indicating the intensity, and a first arithmetic circuit that calculates a first detection angle based on the output signals of the first and second detection circuits, the first detection angle being a detected value of the first angle. The output signal of the first detection circuit and the output signal of the second detection circuit differ in phase by an odd number of times ¼ of a period of the output signals of the first and second detection circuits.

The second detection unit includes third and fourth detection circuits each of which detects an intensity of a component of the external magnetic field in one direction and outputs a signal indicating the intensity, and a second arithmetic circuit that calculates a second detection angle based on the output signals of the third and fourth detection circuits, the second detection angle being a detected value of the second angle. The output signal of the third detection circuit and the output signal of the fourth detection circuit differ in phase by an odd number of times $1/4$ of a period of the output signals of the third and fourth detection circuits.

The first detection angle includes a first angular error with respect to a theoretical value of the first angle that is assumed when the direction of the external magnetic field rotates in an ideal way. The second detection angle includes a second angular error with respect to a theoretical value of the second angle that is assumed when the direction of the external magnetic field rotates in an ideal way.

In the first magnetic sensor, the first angular error and the second angular error make periodical changes at an equal error period in response to a change of the direction of the external magnetic field. The change of the first angular error depends on a change of the first detection angle. The change of the second angular error depends on a change of the second detection angle. The first detection angle and the second detection angle differ in phase by an odd number of times $1/2$ of the error period. The first magnetic sensor further includes a third arithmetic circuit that calculates a detected value of the angle that the direction of the external magnetic field in the reference position forms with respect to the reference direction, based on the first detection angle and the second detection angle.

According to the first magnetic sensor, the first detection angle and the second detection angle differ in phase by an odd number of times $1/2$ of the error period. Consequently, when calculating the detected value of the angle that the direction of the external magnetic field in the reference position forms with respect to the reference direction based on the first detection angle and the second detection angle, it is possible to cancel out the first angular error included in the first detection angle and the second angular error included in the second detection angle. This makes it possible to reduce the error in the angle detected by the magnetic sensor.

In the first magnetic sensor, the first position and the second position may fall on an identical position in terms of the direction of rotation of the external magnetic field. The first direction and the second direction may differ by a spatial angle equivalent to an odd number of times $1/2$ of the error period in the direction of rotation of the external magnetic field.

In the first magnetic sensor, the first position and the second position may be different from each other. An interval between the first position and the second position may be equivalent to an odd number of times $1/2$ of the error period.

In the first magnetic sensor, the output signals of the first to fourth detection circuits are equal in period, and the error period may be $1/4$ of the period of the output signals of the first to fourth detection circuits.

In the first magnetic sensor, each of the first to fourth detection circuits may include a pair of magnetic detection elements connected in series. In such a case, each of the first to fourth detection circuits may have a Wheatstone bridge circuit that includes a first pair of magnetic detection elements connected in series and a second pair of magnetic detection elements connected in series. The magnetic detection elements may be magnetoresistive elements. Each of the magnetoresistive elements may have a magnetization pinned layer whose direction of magnetization is pinned, a free layer whose direction of magnetization varies with the direction of the external magnetic field, and a nonmagnetic layer disposed between the magnetization pinned layer and the free layer. The directions of magnetization of the magnetization pinned layers of the magnetoresistive elements in the second detection circuit may be orthogonal to those of the magnetization pinned layers of the magnetoresistive elements in the first detection circuit. The directions of magnetization of the magnetization pinned layers of the magnetoresistive elements in the fourth detection circuit may be orthogonal to those of the magnetization pinned layers of the magnetoresistive elements in the third detection circuit.

In the second magnetic sensor, the first angular error and the second angular error make periodical changes at an equal error period in response to a change of the direction of the external magnetic field. The change of the first angular error and the change of the second angular error depend on the change of the direction of the external magnetic field. The first position and the second position are different from each other, and an interval between the first position and the second position is equivalent to an odd number of times $1/2$ of the error period. The second magnetic sensor further includes a third arithmetic circuit that calculates a detected value of the angle that the direction of the external magnetic field in the reference position forms with respect to the reference direction, based on the first detection angle and the second detection angle.

According to the second magnetic sensor, the first position where the first detection unit detects the first angle and the second position where the second detection unit detects the second angle differ from each other by an amount of interval therebetween equivalent to an odd number of times $1/2$ of the error period. Consequently, when calculating the detected value of the angle that the direction of the external magnetic field in the reference position forms with respect to the reference direction based on the first detection angle and the second detection angle, it is possible to cancel out the first angular error included in the first detection angle and the second angular error included in the second detection angle. This makes it possible to reduce the error in the angle detected by the magnetic sensor.

In the second magnetic sensor, the error period may be one half period of the rotation of the direction of the external magnetic field.

In the second magnetic sensor, each of the first to fourth detection circuits may include a pair of magnetic detection elements connected in series. In such a case, each of the first to fourth detection circuits may have a Wheatstone bridge circuit that includes a first pair of magnetic detection elements connected in series and a second pair of magnetic detection elements connected in series. The magnetic detection elements may be magnetoresistive elements. Each of the magnetoresistive elements may have a magnetization pinned layer whose direction of magnetization is pinned, a free layer whose direction of magnetization varies with the direction of the external magnetic field, and a nonmagnetic layer disposed between the magnetization pinned layer and the free layer. The directions of magnetization of the magnetization pinned layers of the magnetoresistive elements in the second detection circuit may be orthogonal to those of the magnetization pinned layers of the magnetoresistive elements in the first detection circuit. The directions of magnetization of the magnetization pinned layers of the magnetoresistive elements in the fourth detection circuit may be orthogonal to those of the magnetization pinned layers of the magnetoresistive elements in the third detection circuit.

In the second magnetic sensor, the first angular error may include a component that changes at the error period depending on the change of the direction of the external magnetic field, and a component that changes at a second error period depending on a change of the first detection angle. The second angular error may include a component that changes at the error period depending on the change of the direction of the external magnetic field, and a component that changes at the second error period depending on a change of the second detection angle. The first detection angle and the second detection angle may differ in phase by an odd number of times ½ of the second error period.

According to the first or second magnetic sensor of the present invention, it is possible to cancel out the first angular error included in the first detection angle and the second angular error included in the second detection angle when calculating the detected value of the angle that the direction of the external magnetic field in the reference position forms with respect to the reference direction based on the first detection angle and the second detection angle. This makes it possible to reduce the error in the angle detected by the magnetic sensor.

Other and further objects, features and advantages of the present invention will appear more fully from the following description.

DETAILED DESCRIPTION OF THE PREFERRED EMBODIMENTS

First Embodiment

Figure 1:
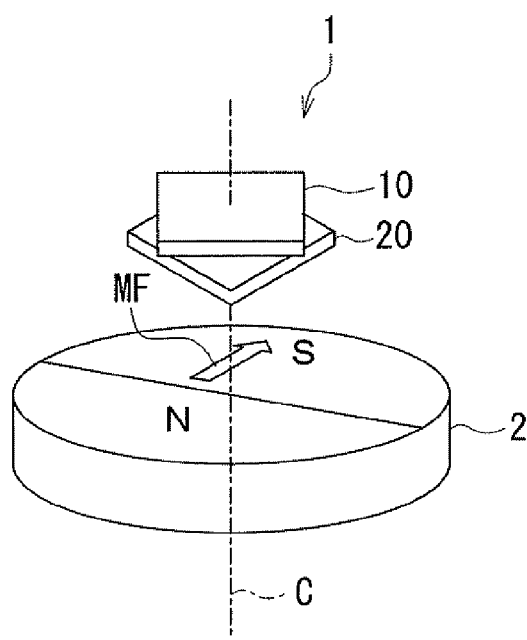
FIG. 1 is a perspective view showing the general configuration of a magnetic sensor according to a first embodiment of the invention.
Figure 2:
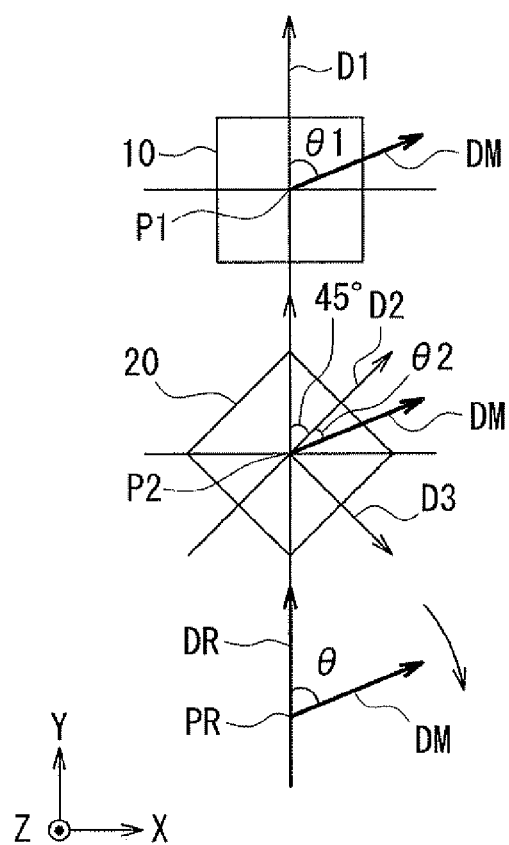
FIG. 2 is an explanatory diagram showing the definitions of directions and angles in the first embodiment of the invention.

Preferred embodiments of the present invention will now be described in detail with reference to the drawings. First, reference is made to FIG. 1 and FIG. 2 to describe the general configuration of a magnetic sensor according to a first embodiment of the invention. FIG. 1 is a perspective view showing the general configuration of the magnetic sensor according to the present embodiment. FIG. 2 is an explanatory diagram showing the definitions of directions and angles in the present embodiment.

As shown in FIG. 1, the magnetic sensor 1 according to the present embodiment detects the angle that the direction of an external magnetic field MF in a reference position forms with respect to a reference direction, the external magnetic field MF rotating in direction. As an example of the means for generating the external magnetic field MF that rotates in direction, FIG. 1 shows a magnet 2 shaped like a cylinder. The magnet 2 has an N pole and an S pole that are arranged symmetrically about a virtual plane that includes the center axis of the cylinder. The magnet 2 rotates about the center axis of the cylinder. Consequently, the direction of the external magnetic field MF generated by the magnet 2 rotates about the center of rotation C that includes the center axis of the cylinder. The magnetic sensor 1 is disposed to face one of the end faces of the magnet 2. Other examples of usage of the magnetic sensor 1 will be shown later. It should be noted that the means for generating the external magnetic field MF rotating in direction is not limited to the magnet 2 shown in FIG. 1.

The magnetic sensor 1 includes a first detection unit 10 and a second detection unit 20. The first detection unit 10 is intended to detect a first angle that the direction of the external magnetic field MF in a first position forms with respect to a first direction. The second detection unit 20 is intended to detect a second angle that the direction of the external magnetic field in a second position forms with respect to a second direction. For ease of understanding, FIG. 1 shows the first detection unit 10 and the second detection unit 20 as separate members. However, the first detection unit 10 and the second detection unit 20 may be integrated with each other.

With reference to FIG. 2, the definitions of the directions and angles in the present embodiment will be described. First, a direction that is parallel to the center of rotation C shown in FIG. 1 and is from the one of the end faces of the magnet 2 to the magnetic sensor 1 will be defined as the Z direction. Next, two mutually-orthogonal directions on a virtual plane perpendicular to the Z direction will be defined as the X direction and Y direction. In FIG. 2, the X direction is shown as the direction toward the right, and the Y direction is shown as the upward direction. The direction opposite to the X direction will be defined as the −X direction, and the direction opposite to the Y direction will be defined as the −Y direction.

A reference position PR is the position where the magnetic sensor 1 detects the external magnetic field MF. For example, the reference position PR shall be where the first detection unit 10 is located. A reference direction DR shall be the Y direction. The angle that the direction DM of the external magnetic field MF in the reference position PR forms with respect to the reference direction DR will be represented by the symbol $\theta$. The direction DM of the external magnetic field MF shall rotate clockwise in FIG. 2. The angle $\theta$ will be expressed in a positive value when seen clockwise from the reference direction DR, and in a negative value when seen counterclockwise from the reference direction DR.

A first position P1 is the position where the first detection unit 10 detects the external magnetic field MF. In the present embodiment, the first position P1 coincides with the reference position PR. A first direction D1 is the referential direction with respect to which the first detection unit 10 indicates the direction DM of the external magnetic field MF. In the present embodiment, the first direction D1 coincides with the reference direction DR. The first angle that the direction DM of the external magnetic field MF forms with respect to the first direction D1 will be represented by the symbol $\theta 1$. The positive and negative signs on the angle $\theta 1$ will be defined the same as with the angle $\theta$. In the present embodiment, the angle $\theta 1$ coincides with the angle $\theta$.

A second position P2 is the position where the second detection unit 20 detects the external magnetic field MF. In the present embodiment, the second position P2 falls on the same position as the first position P1 in terms of the direction of rotation of the external magnetic field MF. In the present embodiment in particular, the second position P2 coincides with the reference position PR and the first position P1. A second direction D2 is the referential direction with respect to which the second detection unit 20 indicates the direction DM of the external magnetic field MF. In the present embodiment, the second direction D2 lies in parallel with the XY plane and is inclined 45° in the direction of rotation of the external magnetic field MF with respect to the first direction D1. The reason will be detailed later. The second angle that the direction DM of the external magnetic field MF forms with respect to the second direction D2 will be represented by the symbol $\theta 2$. The positive and negative signs on the angle $\theta 2$ will be defined the same as with the angle $\theta$. In the present embodiment, the angle $\theta 2$ is smaller than the angle $\theta$ by 45°. The direction rotated 90° from the second direction D2 will be denoted by the symbol D3.

Figure 3:
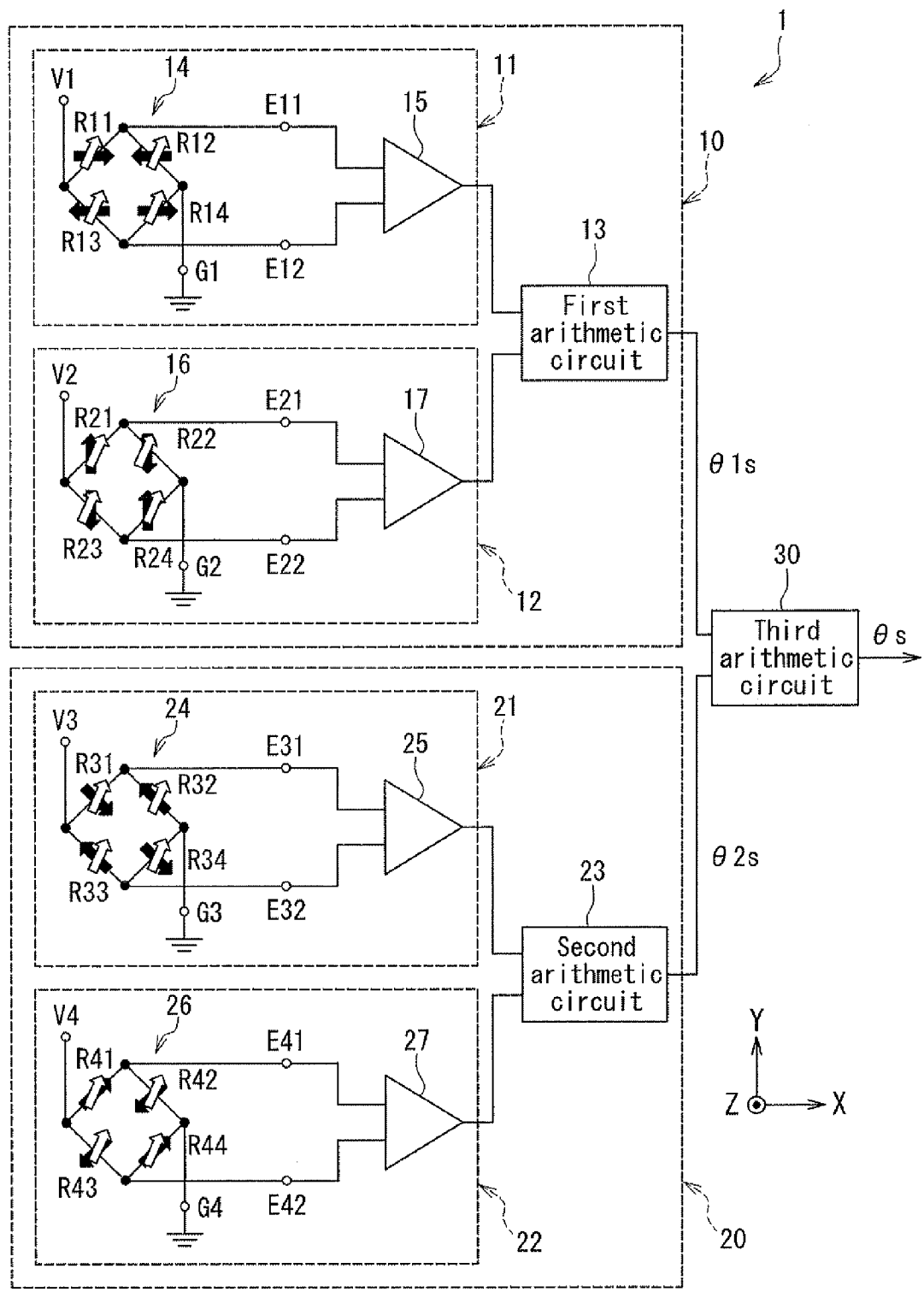
FIG. 3 is a circuit diagram showing the configuration of the magnetic sensor according to the first embodiment of the invention.

Next, the configuration of the magnetic sensor 1 will be described in detail with reference to FIG. 3. FIG. 3 is a circuit diagram showing the configuration of the magnetic sensor 1. As mentioned previously, the magnetic sensor 1 includes the first detection unit 10 and the second detection unit 20. The first detection unit 10 includes first and second detection circuits 11 and 12 and a first arithmetic circuit 13. The first and second detection circuits 11 and 12 each detect the intensity of a component of the external magnetic field MF in one direction, and output a signal that indicates the intensity. Based on the output signals of the first and second detection circuits 11 and 12, the first arithmetic circuit 13 calculates a first detection angle $\theta 1s$ which is the detected value of the first angle $\theta 1$. The output signal of the first detection circuit 11 and the output signal of the second detection circuit 12 differ in phase by an odd number of times ¼ of the period of the output signals of the detection circuits 11 and 12.

The second detection unit 20 has basically the same configuration as that of the first detection unit 10. Specifically, the second detection unit 20 includes third and fourth detection circuits 21 and 22 and a second arithmetic circuit 23. The third and fourth detection circuits 21 and 22 each detect the intensity of a component of the external magnetic field MF in one direction, and output a signal that indicates the intensity. Based on the output signals of the third and fourth detection circuits 21 and 22, the second arithmetic circuit 23 calculates a second detection angle $\theta 2s$ which is the detected value of the second angle $\theta 2$. The output signal of the third detection circuit 21 and the output signal of the fourth detection circuit 22 differ in phase by an odd number of times ¼ of the period of the output signals of the detection circuits 21 and 22. The output signals of the detection circuits 11, 12, 21, and 22 are equal in period.

The magnetic sensor 1 further includes a third arithmetic circuit 30. The third arithmetic circuit 30 calculates the detected value θs of the angle θ that the direction DM of the external magnetic field MF in the reference position PR forms with respect to the reference direction DR, based on the first detection angle θ1s obtained by the first detection unit 10 and the second detection angle θ2s obtained by the second detection unit 20. In the present embodiment, the third arithmetic circuit 30 calculates θs by the following equation (1):

$$\theta s=(\theta 1s+\theta 2s+\pi/4)/2 \tag{1}$$

The first detection circuit 11 has a Wheatstone bridge circuit 14 and a difference detector 15. The Wheatstone bridge circuit 14 includes a power supply port V1, a ground port G1, two output ports E11 and E12, a first pair of magnetic detection elements R11 and R12 connected in series, and a second pair of magnetic detection elements R13 and R14 connected in series. One end of each of the magnetic detection elements R11 and R13 is connected to the power supply port V1. The other end of the magnetic detection element R11 is connected to one end of the magnetic detection element R12 and the output port E11. The other end of the magnetic detection element R13 is connected to one end of the magnetic detection element R14 and the output port E12. The other end of each of the magnetic detection elements R12 and R14 is connected to the ground port G1. A power supply voltage of predetermined magnitude is applied to the power supply port V1. The ground port G1 is grounded. The difference detector 15 outputs to the first arithmetic circuit 13 a signal that corresponds to the potential difference between the output ports E11 and E12.

The second detection circuit 12 has a Wheatstone bridge circuit 16 and a difference detector 17. The Wheatstone bridge circuit 16 includes a power supply port V2, a ground port G2, two output ports E21 and E22, a first pair of magnetic detection elements R21 and R22 connected in series, and a second pair of magnetic detection elements R23 and R24 connected in series. One end of each of the magnetic detection elements R21 and R23 is connected to the power supply port V2. The other end of the magnetic detection element R21 is connected to one end of the magnetic detection element R22 and the output port E21. The other end of the magnetic detection element R23 is connected to one end of the magnetic detection element R24 and the output port E22. The other end of each of the magnetic detection elements R22 and R24 is connected to the ground port G2. A power supply voltage of predetermined magnitude is applied to the power supply port V2. The ground port G2 is grounded. The difference detector 17 outputs to the first arithmetic circuit 13 a signal that corresponds to the potential difference between the output ports E21 and E22.

The third detection circuit 21 includes a Wheatstone bridge circuit 24 and a difference detector 25. The Wheatstone bridge circuit 24 includes a power supply port V3, a ground port G3, two output ports E31 and E32, a first pair of magnetic detection elements R31 and R32 connected in series, and a second pair of magnetic detection elements R33 and R34 connected in series. One end of each of the magnetic detection elements R31 and R33 is connected to the power supply port V3. The other end of the magnetic detection element R31 is connected to one end of the magnetic detection element R32 and the output port E31. The other end of the magnetic detection element R33 is connected to one end of the magnetic detection element R34 and the output port E32. The other end of each of the magnetic detection elements R32 and R34 is connected to the ground port G3. A power supply voltage of predetermined magnitude is applied to the power supply port V3. The ground port G3 is grounded. The difference detector 25 outputs to the second arithmetic circuit 23 a signal that corresponds to the potential difference between the output ports E31 and E32.

The fourth detection circuit 22 includes a Wheatstone bridge circuit 26 and a difference detector 27. The Wheatstone bridge circuit 26 includes a power supply port V4, a ground port G4, two output ports E41 and E42, a first pair of magnetic detection elements R41 and R42 connected in series, and a second pair of magnetic detection elements R43 and R44 connected in series. One end of each of the magnetic detection elements R41 and R43 is connected to the power supply port V4. The other end of the magnetic detection element R41 is connected to one end of the magnetic detection element R42 and the output port E41. The other end of the magnetic detection element R43 is connected to one end of the magnetic detection element R44 and the output port E42. The other end of each of the magnetic detection elements R42 and R44 is connected to the ground port G4. A power supply voltage of predetermined magnitude is applied to the power supply port V4. The ground port G4 is grounded. The difference detector 27 outputs to the second arithmetic circuit 23 a signal that corresponds to the potential difference between the output ports E41 and E42.

In the present embodiment, all the magnetic detection elements included in the Wheatstone bridge circuits (hereinafter, referred to as bridge circuits) 14, 16, 24, and 26 are MR elements, or TMR elements in particular. GMR elements may be used instead of the TMR elements. TMR elements or GMR elements each have a magnetization pinned layer whose direction of magnetization is pinned, a free layer whose direction of magnetization varies with the direction of the external magnetic field MF, and a nonmagnetic layer that is disposed between the magnetization pinned layer and the free layer. For TMR elements, the nonmagnetic layer is a tunnel barrier layer. For GMR elements, the nonmagnetic layer is a nonmagnetic conductive layer. The TMR elements or GMR elements vary in resistance depending on the angle that the direction of magnetization of the free layer forms with respect to the direction of magnetization of the magnetization pinned layer. The resistance reaches its minimum value when the foregoing angle is 0°. The resistance reaches its maximum value when the foregoing angle is 180°. In the following description, the magnetic detection elements included in the bridge circuits 14, 16, 24, and 26 will be referred to as MR elements. In FIG. 3, the filled allows indicate the directions of magnetization of the magnetization pinned layers in the MR elements. The hollow arrows indicate the directions of magnetization of the free layers in the MR elements.

In the first detection circuit 11, the magnetization pinned layers of the MR elements R11 and R14 are magnetized in the X direction, and the magnetization pinned layers of the MR elements R12 and R13 are magnetized in the −X direction. In such a case, the potential difference between the output ports E11 and E12 varies according to the intensity of the component of the external magnetic field MF in the X direction. The first detection circuit 11 then detects the intensity of the component of the external magnetic field MF in the X direction, and outputs the signal that indicates the intensity. When the first angle θ1 shown in FIG. 2 is 0° or 180°, the intensity of the component of the external magnetic field MF in the X direction is 0. When the first angle θ1 is greater than 0° and smaller than 180°, the intensity of the component of the external magnetic field MF in the X direction is positive in value. When the first angle θ1 is greater than 180° and smaller than 360°, the intensity of the component of the external magnetic field MF in the X direction is negative in value.

In the second detection circuit 12, the magnetization pinned layers of the MR elements R21 and R24 are magnetized in the Y direction, and the magnetization pinned layers of the MR elements R22 and R23 are magnetized in the −Y direction. In such a case, the potential difference between the output ports E21 and E22 varies according to the intensity of the component of the external magnetic field MF in the Y direction. The second detection circuit 12 then detects the intensity of the component of the external magnetic field MF in the Y direction, and outputs the signal that indicates the intensity. When the first angle θ1 shown in FIG. 2 is 90° or 270°, the intensity of the component of the external magnetic field MF in the Y direction is 0. When the first angle θ1 is greater than or equal to 0° and smaller than 90°, or greater than 270° and smaller than or equal to 360°, the intensity of the component of the external magnetic field MF in the Y direction is positive in value. When the first angle θ1 is greater than 90° and smaller than 270°, the intensity of the component of the external magnetic field MF in the Y direction is negative in value.

In the example shown in FIG. 3, the directions of magnetization of the magnetization pinned layers in the MR elements of the second detection circuit 12 are orthogonal to those of the magnetization pinned layers in the MR elements of the first detection circuit 11. In an ideal situation, the output signal of the first detection circuit 11 traces a sine waveform, and the output signal of the second detection circuit 12 traces a cosine waveform. In such a case, the phase difference between the output signals of the detection circuits 11 and 12 is ¼ the period of the output signals of the detection circuits 11 and 12. Assuming that the output signal of the first detection circuit 11 is expressed as sin θ1s and the output signal of the second detection circuit 12 is expressed as cos θ1s, the first detection angle θ1s can be calculated by the following equation (2):

$$\theta 1s = \operatorname{atan}(\sin \theta 1s / \cos \theta 1s), \quad (2)$$

where "atan" represents an arctangent.

Within the range of 360°, θ1s in equation (2) has two solutions with a difference of 180° in value. Which of the two solutions of θ1s in equation (2) is the true solution to θ1s can be determined from the combination of positive and negative signs on sin θ1s and cos θ1s. More specifically, θ1s is greater than 0° and smaller than 180° if sin θ1s is positive in value. θ1s is greater than 180° and smaller than 360° if sin θ1s is negative in value. θ1s is greater than or equal to 0° and smaller than 90°, or greater than 270° and smaller than or equal to 360°, if cos θ1s is positive in value. θ1s is greater than 90° and smaller than 270° if cos θ1s is negative in value. The first arithmetic circuit 13 determines θ1s in the range of 360°, based on equation (2) and the foregoing evaluation on the combination of positive and negative signs on sin θ1s and cos θ1s. Note that it is possible to determine θ1s not only when the phase difference between the output signals of the detection circuits 11 and 12 is ¼ the period of the output signals of the detection circuits 11 and 12, but also when the phase difference is an odd number of times ¼ of the period of the output signals of the detection circuits 11 and 12.

In the third detection circuit 21, the magnetization pinned layers of the MR elements R31 and R34 are magnetized in the direction D3 shown in FIG. 2, and the magnetization pinned layers of the MR elements R32 and R33 are magnetized in the direction opposite to the direction D3. In such a case, the potential difference between the output ports E31 and E32 varies according to the intensity of the component of the external magnetic field MF in the direction D3. The third detection circuit 21 then detects the intensity of the component of the external magnetic field MF in the direction D3, and outputs the signal that indicates the intensity. When the second angle θ2 shown in FIG. 2 is 0° or 180°, the intensity of the component of the external magnetic field MF in the direction D3 is 0. When the second angle θ2 is greater than 0° and smaller than 180°, the intensity of the component of the external magnetic field MF in the direction D3 is positive in value. When the second angle θ2 is greater than 180° and smaller than 360°, the intensity of the component of the external magnetic field MF in the direction D3 is negative in value.

In the fourth detection circuit 22, the magnetization pinned layers of the MR elements R41 and R44 are magnetized in the direction D2 shown in FIG. 2, and the magnetization pinned layers of the MR elements R42 and R43 are magnetized in the direction opposite to the direction D2. In such a case, the potential difference between the output ports E41 and E42 varies according to the intensity of the component of the external magnetic field MF in the direction D2. The fourth detection circuit 22 then detects the intensity of the component of the external magnetic field MF in the direction D2, and outputs the signal that indicates the intensity. When the second angle θ2 shown in FIG. 2 is 90° or 270°, the intensity of the component of the external magnetic field MF in the direction D2 is 0. When the second angle θ2 is greater than or equal to 0° and smaller than 90°, or greater than 270° and smaller than or equal to 360°, the intensity of the component of the external magnetic field MF in the direction D2 is positive in value. When the second angle θ2 is greater than 90° and smaller than 270°, the intensity of the component of the external magnetic field MF in the direction D2 is negative in value.

In the example shown in FIG. 3, the directions of magnetization of the magnetization pinned layers in the MR elements of the fourth detection circuit 22 are orthogonal to those of the magnetization pinned layers in the MR elements of the third detection circuit 21. In an ideal situation, the output signal of the third detection circuit 21 traces a sine waveform, and the output signal of the fourth detection circuit 22 traces a cosine waveform. In such a case, the phase difference between the output signals of the detection circuits 21 and 22 is ¼ the period of the output signals of the detection circuits 21 and 22. Assuming that the output signal of the third detection circuit 21 is expressed as sin θ2s and the output signal of the fourth detection circuit 22 is expressed as cos θ2s, the second detection angle θ2s can be calculated by the following equation (3):

$$\theta 2s = \operatorname{atan}(\sin \theta 2s / \cos \theta 2s). \quad (3)$$

As with the determination of θ1s described previously, the second arithmetic circuit 23 determines θ2s in the range of 360°, based on equation (3) and the evaluation on the combination of positive and negative signs on sin θ2s and cos θ2s. Note that it is possible to determine θ2s not only when the phase difference between the output signals of the detection circuits 21 and 22 is ¼ the period of the output signals of the detection circuits 21 and 22, but also when the phase difference is an odd number of times ¼ of the period of the output signals of the detection circuits 21 and 22.

The second direction D2 shown in FIG. 2 may be inclined −45° in the direction of rotation of the external magnetic field MF with respect to the first direction D1. In such a case, the directions of magnetization of the magnetization pinned layers in all the MR elements included in the third and fourth detection circuits 21 and 22 are rotated −90° from the respective directions shown in FIG. 3. Here, the third arithmetic circuit 30 calculates θs by using not equation (1) but instead the following equation (4):

$$\theta s=(\theta 1s+\theta 2s-\pi/4)/2. \quad (4)$$

The first to third arithmetic circuits 13, 23, and 30 can be implemented by a single microcomputer, for example.

Figure 4:
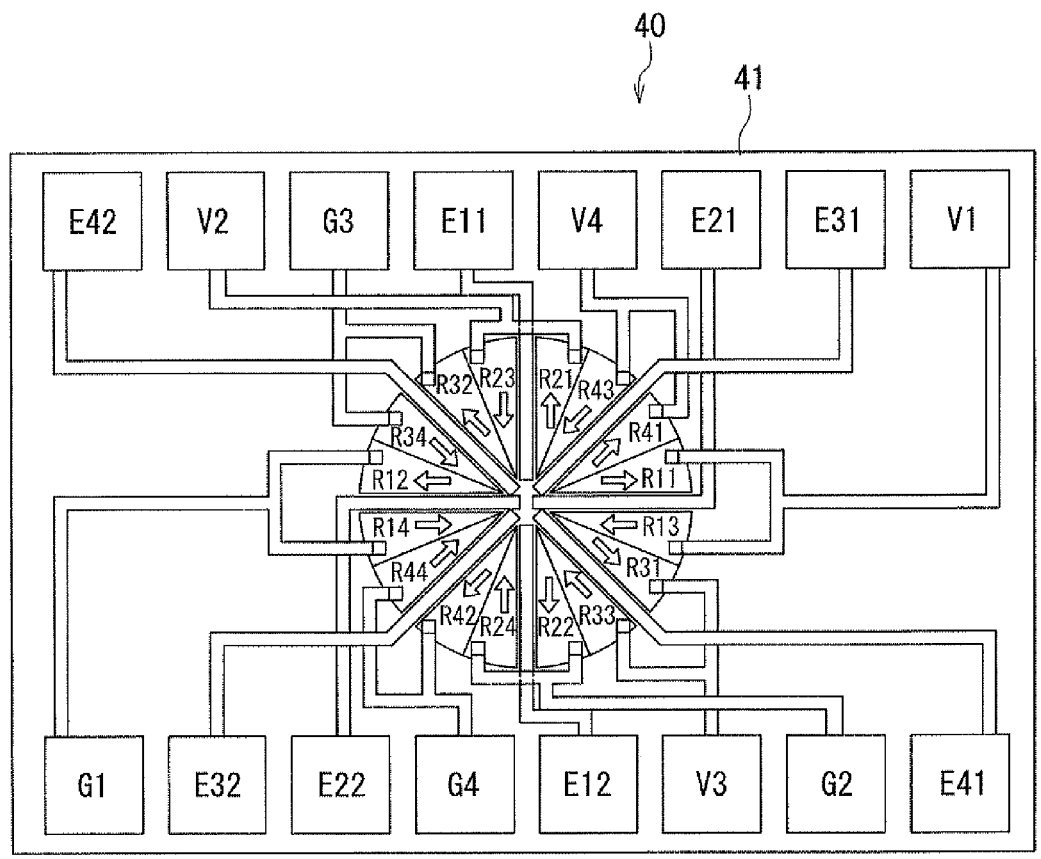
FIG. 4 is a plan view of a unit that integrates four bridge circuits of the magnetic sensor shown in FIG. 3.

Next, with reference to FIG. 4, a description will be given of an example of a unit 40 that integrates the bridge circuits 14, 16, 24, and 26 of the magnetic sensor 1. FIG. 4 is a plan view of the unit 40. The unit 40 includes a substrate 41, and the bridge circuits 14, 16, 24, and 26 provided on the substrate 41. The plurality of ports of the bridge circuits 14, 16, 24, and 26 are arranged on the substrate 41, near peripheral edges of the substrate 41. An MR element layout area of circular shape is provided on the substrate 41. The MR element layout area is circumferentially divided into 16 sections. The MR elements R11 to R14, R21 to R24, R31 to R34, and R41 to R44 are located in the 16 sections, respectively. Wiring for electrically connecting the plurality of MR elements to the plurality of ports is formed on the substrate 41.

Figure 5:
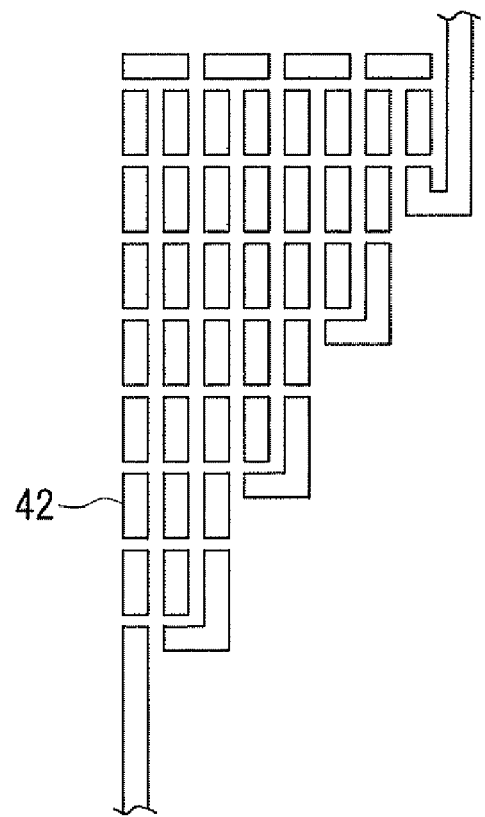
FIG. 5 is a plan view showing a plurality of lower electrodes that are provided in a section shown in FIG. 4.
Figure 6:
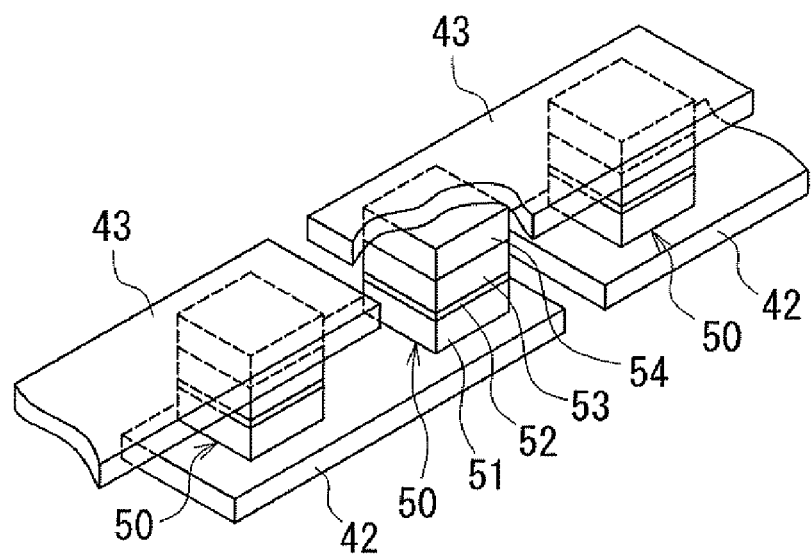
FIG. 6 is a perspective view showing a part of an MR element of FIG. 4.

Next, an example of the configuration of an arbitrary MR element in the unit 40 shown in FIG. 4 will be described with reference to FIG. 5 and FIG. 6. FIG. 5 is a plan view showing a plurality of lower electrodes that are arranged in a section shown in FIG. 4. FIG. 6 is a perspective view showing a part of an MR element of FIG. 4. In this example, an MR element has a plurality of lower electrodes, a plurality of MR films, and a plurality of upper electrodes. As shown in FIG. 5, in a section, the plurality of lower electrodes 42 are arranged on the substrate 41. Each lower electrode 42 is oblong in shape, and the plurality of lower electrodes 42 are arranged in a meandering configuration as a whole. Two lower electrodes 42 adjoining in the longitudinal direction of the lower electrodes 42 have a gap therebetween. As shown in FIG. 6, MR films 50 are provided on the top surfaces of the lower electrodes 42, near opposite ends in the longitudinal direction. Each MR film 50 includes a free layer 51, a nonmagnetic layer 52, a magnetization pinned layer 53, and an antiferromagnetic layer 54 that are stacked in this order, the free layer 51 being closest to the lower electrode 42. The free layer 51 is electrically connected to the lower electrode 42. The antiferromagnetic layer 54 is made of an antiferromagnetic material. The antiferromagnetic layer 54 is in exchange coupling with the magnetization pinned layer 53 so as to pin the direction of magnetization of the magnetization pinned layer 53. The plurality of upper electrodes 43 are arranged over the plurality of MR films 50. Each upper electrode 43 is oblong in shape, and establishes electrical connection between the respective antiferromagnetic layers 54 of two adjoining MR films 50 that are arranged on two lower electrodes 42 adjoining in the longitudinal direction of the lower electrodes 42. Like the plurality of lower electrodes 42, the plurality of upper electrodes 43 are arranged in a meandering configuration as a whole. With such a configuration, the plurality of MR films 50 in the MR element shown in FIG. 5 and FIG. 6 are connected in series by the plurality of lower electrodes 42 and the plurality of upper electrodes 43. It should be appreciated that the layers 51 to 54 of the MR films 50 may be stacked in an order reverse to that shown in FIG. 6.

Next, the operation and effects of the magnetic sensor 1 will be described with reference to FIG. 7 to FIG. 10. In the magnetic sensor 1, the first detection unit 10 determines the first detection angle θ1s, which is the detected value of the first angle θ1, based on the output signals of the first and second detection circuits 11 and 12. The second detection unit 20 determines the second detection angle θ2s, which is the detected value of the second angle θ2, based on the output signals of the third and fourth detection circuits 21 and 22. Based on the first detection angle θ1s and the second detection angle θ2s, the third arithmetic circuit 30 then calculates the detected value θs of the angle θ that the direction DM of the external magnetic field MF in the reference position PR forms with respect to the reference direction DR.

Figure 7:
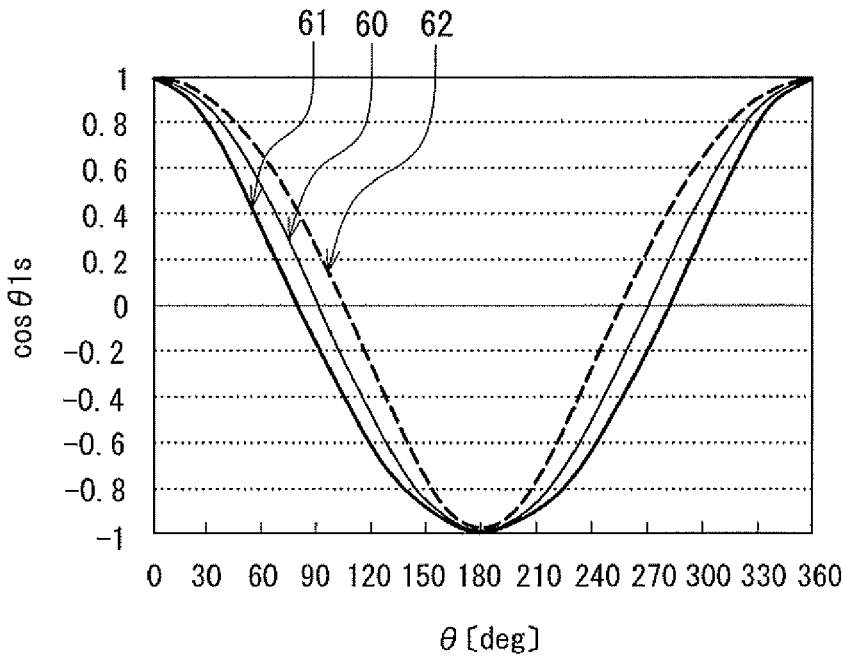
FIG. 7 is a waveform chart showing how the output signals of the detection circuits in FIG. 3 are distorted in waveform.

In the present embodiment, the waveforms of the output signals of the detection circuits 11, 12, 21, and 22 ideally trace sinusoidal curves. In actuality, however, the waveforms of the output signals of the detection circuits 11, 12, 21, and 22 are distorted from the sinusoidal curves since the output signal waveforms of the MR elements are distorted due to the MR elements. Examples of the situation where the output signal waveforms of the MR elements are distorted due to the MR elements include: when the directions of magnetization of the magnetization pinned layers in the MR elements vary due to the influence of the external magnetic field MF or the like; and when the directions of magnetization of the free layers in the MR elements do not coincide with the direction of the external magnetic field MF because of such factors as the shape anisotropy and coercivity of the free layers. FIG. 7 shows how the output signals of the detection circuits are distorted in waveform. FIG. 7 shows the waveform of the output signal of the detection circuit 12 which typifies the detection circuits 11, 12, 21, and 22. In FIG. 7, the horizontal axis indicates the angle θ, and the vertical axis indicates the output signal cos θ1s of the detection circuit 12. The reference numeral 60 designates an ideal sinusoidal curve. The two waveforms designated by the reference numerals 61 and 62 show waveforms that are distorted due to the MR elements.

As mentioned above, the output signals of the detection circuits 11 and 12 are distorted in waveform due to the MR elements. The first detection angle θ1s therefore includes a first angular error dθ1 with respect to the theoretical value of the first angle θ1 that is assumed when the direction DM of the external magnetic field MF rotates in an ideal way. Similarly, since the output signals of the detection circuits 21 and 22 are distorted in waveform due to the MR elements, the second detection angle θ2s includes a second angular error dθ2 with respect to the theoretical value of the second angle θ2 that is assumed when the direction DM of the external magnetic field MF rotates in an ideal way. The first angular error dθ1 and the second angular error dθ2 make periodical changes at an equal error period in response to a change of the direction DM of the external magnetic field MF. The change of the first angular error dθ1 depends on a change of the first detection angle θ1s, and the change of the second angular error dθ2 depends on a change of the second detection angle θ2s. When the waveforms of the output signals of the detection circuits are distorted as shown in FIG. 7, the error period is ¼ the period of the output signals of the detection circuits 11, 12, 21 and 22, i.e., π/2 (90°).

Figure 8:
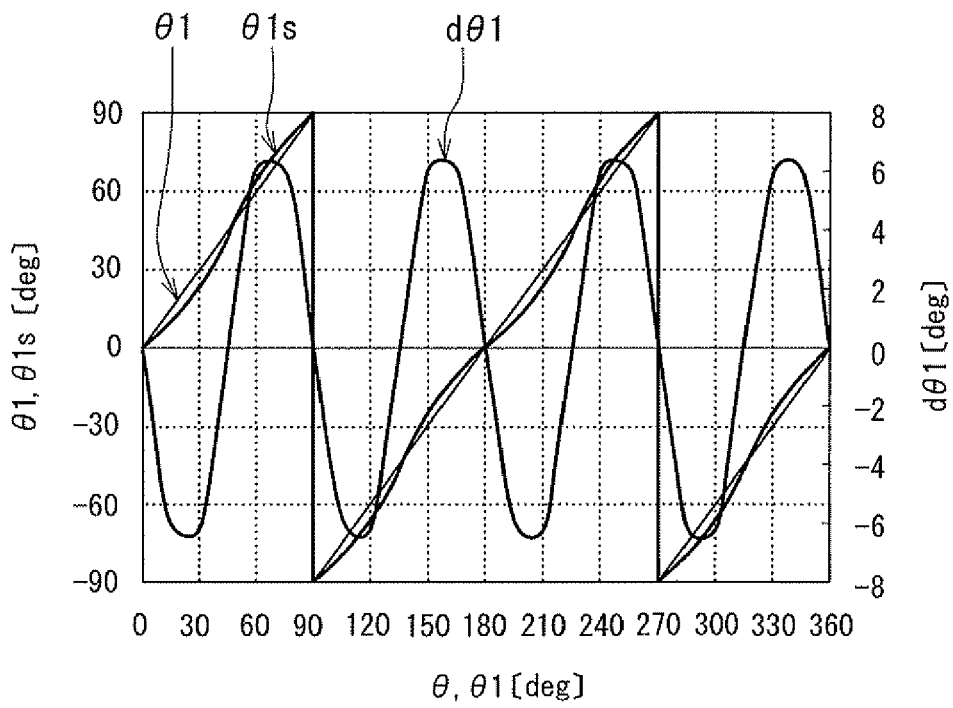
FIG. 8 is a waveform chart showing the relationship between a first detection angle and a first angular error in the first embodiment of the invention.

FIG. 8 shows the relationship between the first detection angle θ1s and the first angular error dθ1. In FIG. 8, the horizontal axis indicates the angles θ and θ1, and the vertical axis indicates the angle θ1, the first detection angle θ1s, and the first angular error dθ1. For the sake of convenience, FIG. 8 shows the angle θ and the first detection angle θ1s on the vertical axis in values after subtraction of 180° if the actual angles are in the range of 90° to 270°, and in values after subtraction of 360° if the actual angles are in the range of 270° to 360°. In the following description, charts similar to FIG. 8 will be shown in the same way as with FIG. 8. The relationship between the second detection angle θ2s and the second angular error dθ2 is the same as in FIG. 8.

Figure 9:
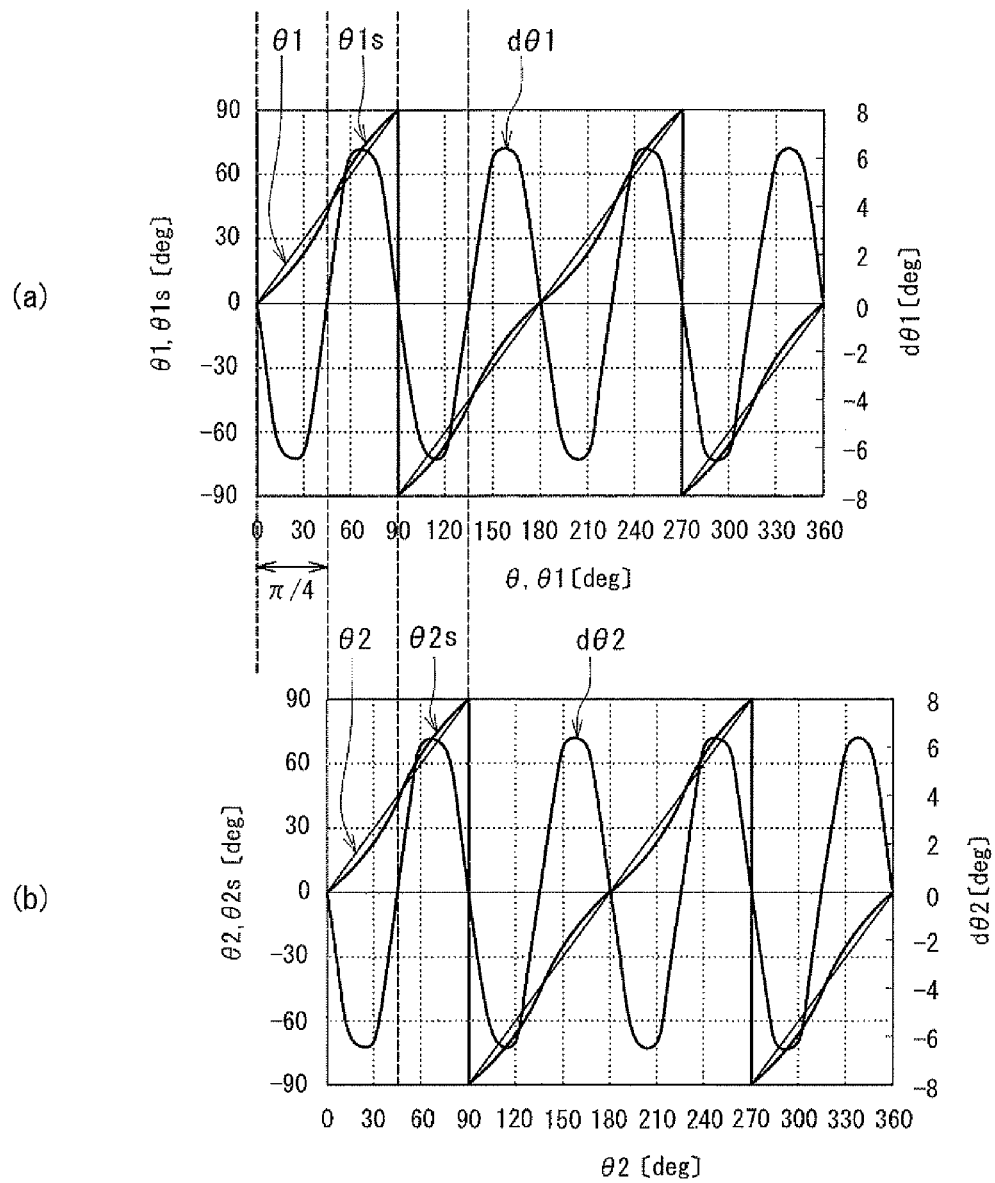
FIG. 9 is an explanatory diagram showing the operation of reducing an angular error in the first embodiment of the invention.

In the present embodiment, the first detection angle $\theta1s$ and the second detection angle $\theta2s$ differ in phase by ½ the error period, i.e., $\pi/4$ (45°). To implement such a difference, in the present embodiment, the second direction D2 is inclined 45° in the direction of rotation of the external magnetic field MF with respect to the first direction D1. According to the present embodiment, it is possible to cancel out the first angular error $d\theta1$ and the second angular error $d\theta2$. This will be described with reference to FIG. 9 and FIG. 10. Portion (a) of FIG. 9 shows the relationship between the first detection angle $\theta1s$ and the first angular error $d\theta1$ shown in FIG. 8. Portion (b) of FIG. 9 shows the relationship between the second detection angle $\theta2s$ and the second angular error $d\theta2$. In the example shown in FIG. 9, the first angular error $d\theta1$ and the second angular error $d\theta2$ have an amplitude of ±6.7°. In the present embodiment, the first detection angle $\theta1s$ and the second detection angle $\theta2s$ are given a difference in phase by an odd number of times ½ of the error period, i.e., $\pi/4$. The detected value $\theta s$ of the angle $\theta$ is calculated by using the first detection angle $\theta1s$ and the second detection angle $\theta2s$. When calculating the detected value $\theta s$, the first angular error $d\theta1$ and the second angular error $d\theta2$ are thus in opposite phases. Consequently, the first angular error $d\theta1$ and the second angular error $d\theta2$ cancel each other out.

Figure 10:
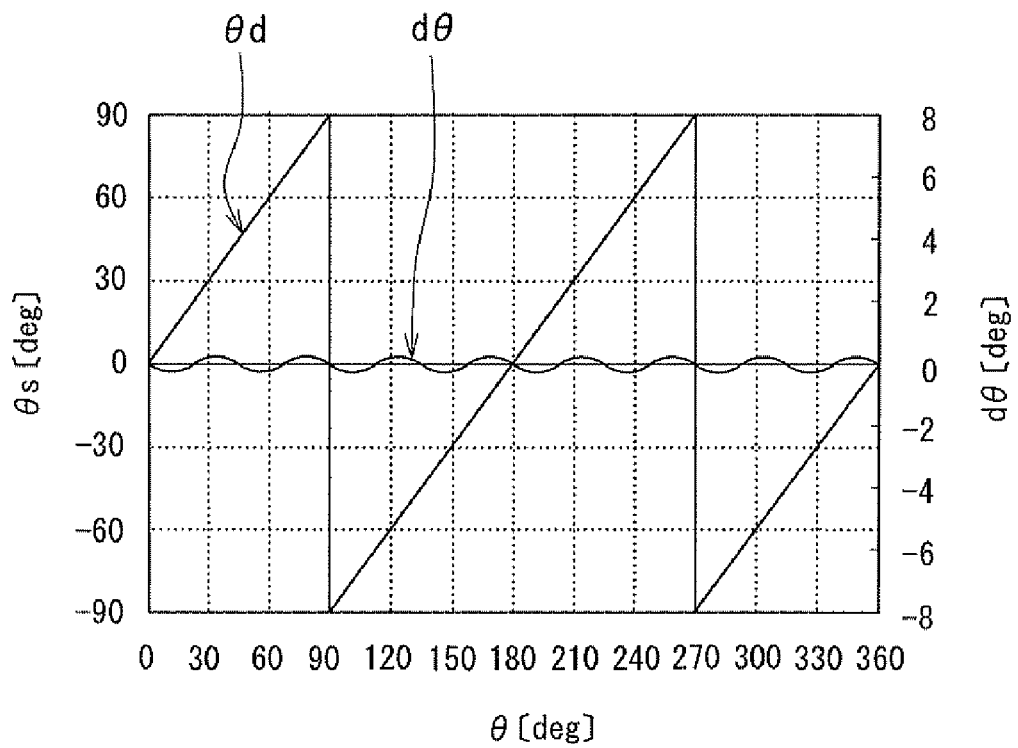
FIG. 10 is a waveform chart showing the relationship between a detected angle value and an angular error in the first embodiment of the invention.

FIG. 10 shows the relationship between the detected value $\theta s$ calculated as described above and an angular error $d\theta$ included in the detected value $\theta s$. As shown in FIG. 10, the angular error $d\theta$ is significantly smaller than the first angular error $d\theta1$ and the second angular error $d\theta2$. In the example shown in FIG. 10, the angular error $d\theta$ has an amplitude of ±0.3°.

It should be noted that the phase difference between the first detection angle $\theta1s$ and the second detection angle $\theta2s$ is not limited to ½ the error period, and may be any odd number of times ½ of the error period. In such a case, the first angular error $d\theta1$ and the second angular error $d\theta2$ can be cancelled out to significantly reduce the angular error $d\theta$ that is included in the detected value $\theta s$. In the present embodiment, the first position P1 and the second position P2 fall on an identical position in terms of the direction of rotation of the external magnetic field MF. Here, the phase difference between the first detection angle $\theta1s$ and the second detection angle $\theta2s$ can be set to an odd number of times ½ of the error period by making the first direction D1 and the second direction D2 differ by a spatial angle equivalent to the odd number of times ½ of the error period in the direction of rotation of the external magnetic field ME. In the example shown in FIG. 2, the first direction D1 and the second direction D2 are made to differ by a spatial angle equivalent to ½ the error period, i.e., 45° in the direction of rotation of the external magnetic field MF.

In the present embodiment, the detection angle is corrected by using the two detection units 10 and 20 which have exactly the same configuration except in the directions of magnetization of the magnetization pinned layers in the MR elements. Although the angular errors in the respective detection units vary as a function of temperature, it is therefore possible to cancel out the angular errors in the respective detection units, including temperature-based variations of the angular errors, to correct the detection angle. Consequently, according to the present embodiment, it is eventually possible to obtain a detected angle value with less temperature-based error variations.

Figure 11:
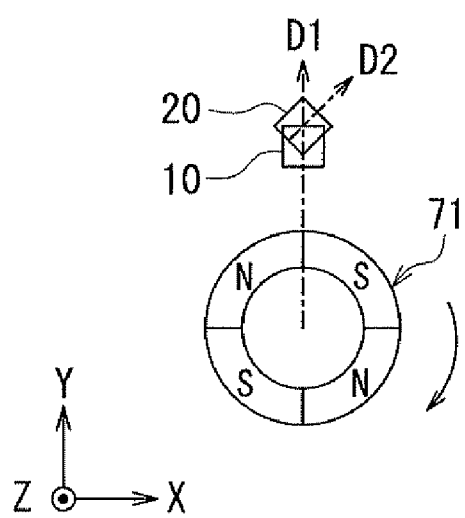
FIG. 11 is an explanatory diagram showing an example of usage of the magnetic sensor according to the first embodiment of the invention.
Figure 12:
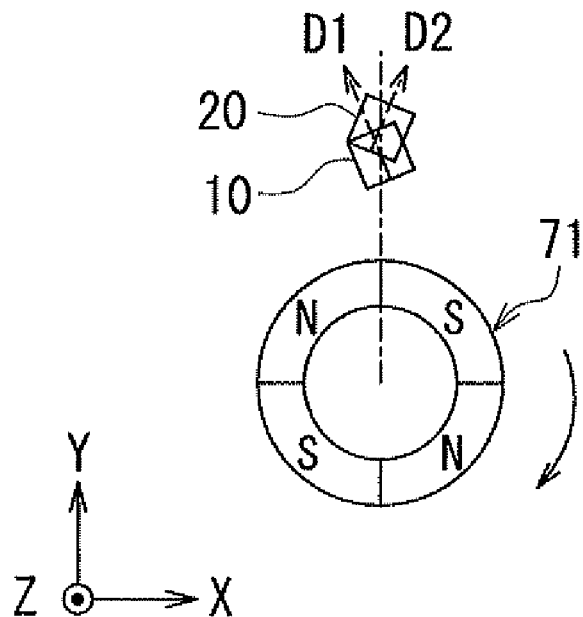
FIG. 12 is an explanatory diagram showing another example of usage of the magnetic sensor according to the first embodiment of the invention.

Next, another example of usage of the magnetic sensor 1 will be described with reference to FIG. 11 to FIG. 14. FIG. 11 and FIG. 12 each show an example where the magnetic sensor 1 is used to detect the direction of an external magnetic field that occurs from the outer periphery of a rotating body 71. The rotating body 71 has one or more pairs of N and S poles that are arranged alternately in an annular configuration. In these examples, the planes of FIG. 11 and FIG. 12 are the XY plane, and the direction perpendicular to the planes is the Z direction. The external magnetic field rotates about the Z direction. In the examples shown in FIG. 11 and FIG. 12, the rotating body 71 includes two pairs of N and S poles. In such cases, one rotation of the rotating body 71 produces two rotations of the external magnetic field.

In the example shown in FIG. 11, the first direction D1, or the referential direction with respect to which the first detection unit 10 indicates the direction of the external magnetic field, is set to a radial direction of the rotating body 71. The second direction D2, or the referential direction with respect to which the second detection unit 20 indicates the direction of the external magnetic field, is inclined 45° in the direction of rotation of the external magnetic field with respect to the first direction D1 within the XY plane.

In the example shown in FIG. 12, the first direction D1 and the second direction D2 are kept at an angle of 45° with respect to each other while both are inclined with respect to the radial direction of the rotating body 71 within the XY plane. The angles that the respective directions D1 and D2 form with respect to the radial direction of the rotating body 71 are preferably equal in absolute value, i.e., 22.5° and −22.5°. The reason is that in such a case, the relative positioning of the detection unit 10 and the external magnetic field is the same as that of the detection unit 20 and the external magnetic field, and this eliminates the need for a correction for a difference in their relative positioning.

Figure 13:
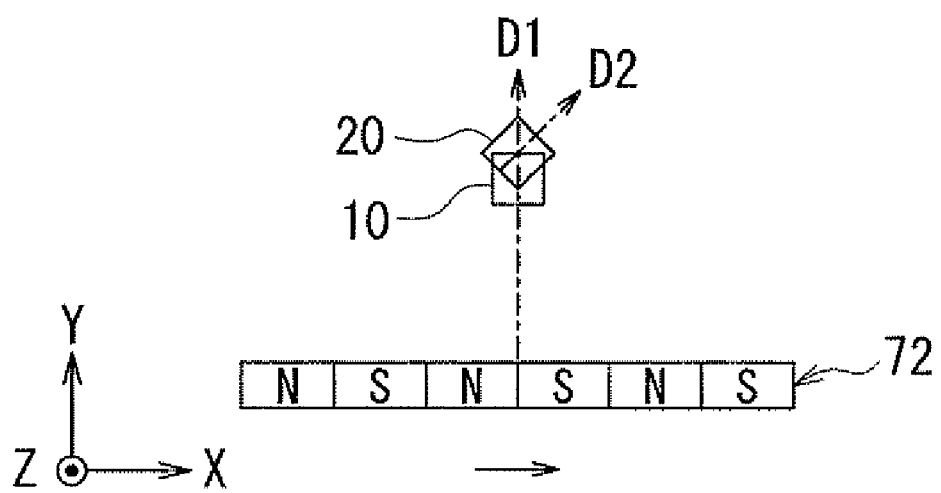
FIG. 13 is an explanatory diagram showing still another example of usage of the magnetic sensor according to the first embodiment of the invention.
Figure 14:
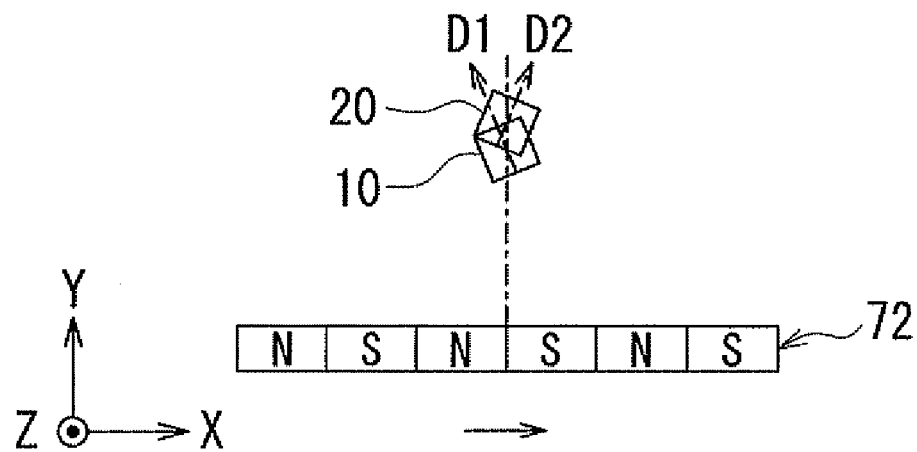
FIG. 14 is an explanatory diagram showing still another example of usage of the magnetic sensor according to the first embodiment of the invention.

FIG. 13 and FIG. 14 each show an example where the magnetic sensor 1 is used to detect the direction of an external magnetic field that occurs from the outer periphery of a moving body 72. The moving body 72 has a plurality of pairs of N and S poles that are arranged alternately in a linear configuration, and moves in the direction of arrangement of the N and S poles. In these examples, the planes of FIG. 13 and FIG. 14 are the XY plane, and the direction perpendicular to the planes is the Z direction. The external magnetic field rotates about the Z direction.

In the example shown in FIG. 13, the first direction D1 is set to a direction orthogonal to the direction of movement of the moving body 72 within the XY plane. The second direction D2 is inclined 45° in the direction of rotation of the external magnetic field with respect to the first direction D1 within the XY plane.

In the example shown in FIG. 14, the first direction D1 and the second direction D2 are kept at an angle of 45° with respect to each other while both are inclined with respect to the direction orthogonal to the direction of movement of the moving body 72 within the XY plane. As in the example shown in FIG. 12, the angles that the respective directions D1 and D2 form with respect to the direction orthogonal to the direction of movement of the moving body 72 are preferably equal in absolute value, i.e., 22.5° and −22.5°.

Second Embodiment

Next, a magnetic sensor according to a second embodiment of the invention will be described with reference to FIG. 15 to FIG. 17. In the magnetic sensor 1 according to the present embodiment, the first position P1 where the first detection unit 10 detects the external magnetic field MF and the second position P2 where the second detection unit 20 detects the external magnetic field MF are different from each other. That is, in the present embodiment, the first detection unit 10 and the second detection unit 20 are located in respective different positions. The interval between the first position P1 and the second position P2 is equivalent to an odd number of times ½ of the error period.

Figure 15:
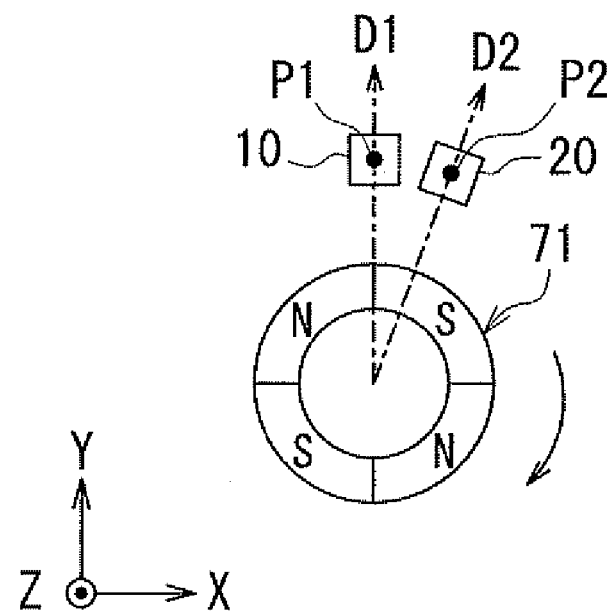
FIG. 15 is an explanatory diagram showing an example of usage of a magnetic sensor according to a second embodiment of the invention.

FIG. 15 shows an example where the magnetic sensor 1 is used to detect the direction of the external magnetic field that occurs from the outer periphery of a rotating body 71 as in the examples shown in FIG. 11 and FIG. 12 according to the first embodiment. In this example, the rotating body 71 includes two pairs of N and S poles. One rotation of the rotating body 71 produces two rotations of the external magnetic field. In such a case, one period of the output signals of the detection circuits 11, 12, 21, and 22, i.e., an electrical angle of 360°, is equivalent to one half rotation of the rotating body 71, i.e., 180° in the angle of rotation of the rotating body 71. The error period is ¼ the period of the output signals of the detection circuits, which is equivalent to an electrical angle of 90° or an angle of rotation 45° of the rotating body 71. In the present embodiment, the interval between the first position P1 and the second position P2 is an odd number of times ½ of the error period, i.e., an odd number of times the electrical angle 45° or an odd number of times the angle of rotation 22.5° of the rotating body 71. FIG. 15 shows the case where the interval between the first position P1 and the second position P2 is 22.5° in terms of the angle of rotation of the rotating body 71.

In the example shown in FIG. 15, the first direction D1, or the referential direction with respect to which the first detection unit 10 indicates the direction of the external magnetic field, and the second direction D2, or the referential direction with respect to which the second detection unit 20 indicates the direction of the external magnetic field, are both set to radial directions of the rotating body 71. Consequently, the phase difference between the first detection angle θ1s and the second detection angle θ2s is an odd number of times ½ of the error period, i.e., an odd number of times the electrical angle 45° or an odd number of times the angle of rotation 22.5° of the rotating body 71.

Figure 16:
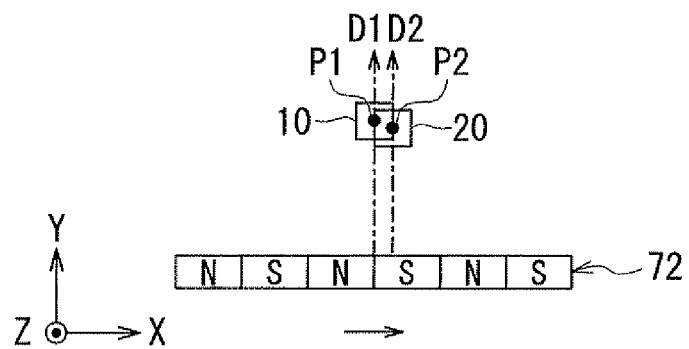
FIG. 16 is an explanatory diagram showing another example of usage of the magnetic sensor according to the second embodiment of the invention.

FIG. 16 shows an example where the magnetic sensor 1 is used to detect the direction of the external magnetic field that occurs from the outer periphery of a moving body 72 as in the examples shown in FIG. 13 and FIG. 14 according to the first embodiment. In this example, the external magnetic field makes one rotation when the moving body 72 moves by one pitch, i.e., as much as a pair of N and S poles. In such a case, one period of the output signals of the detection circuits 11, 12, 21, and 22, i.e., an electrical angle of 360°, is equivalent to one pitch of the moving body 72. The error period is ¼ the period of the output signals of the detection circuits, which is equivalent to one-quarter pitch. In the present embodiment, the interval between the first position P1 and the second position P2 is an odd number of times ½ of the error period, i.e., an odd number of times one-eighth pitch. FIG. 16 shows the case where the interval between the first position P1 and the second position P2 is one-eighth pitch.

In the example shown in FIG. 16, the first direction D1 and the second direction D2 are both set to a direction orthogonal to the direction of movement of the moving body 72 within the XY plane. Consequently, the phase difference between the first detection angle θ1s and the second detection angle θ2s is an odd number of times ½ of the error period, i.e., an odd number of times the electrical angle 45° or an odd number of times one-eighth pitch.

According to the present embodiment, like the first embodiment, the first detection angle θ1s and the second detection angle θ2s differ in phase by an odd number of times ½ of the error period. Consequently, the first angular error dθ1 and the second angular error dθ2 can be cancelled out to significantly reduce the angular error dθ that is included in the detected value θs.

Figure 17:
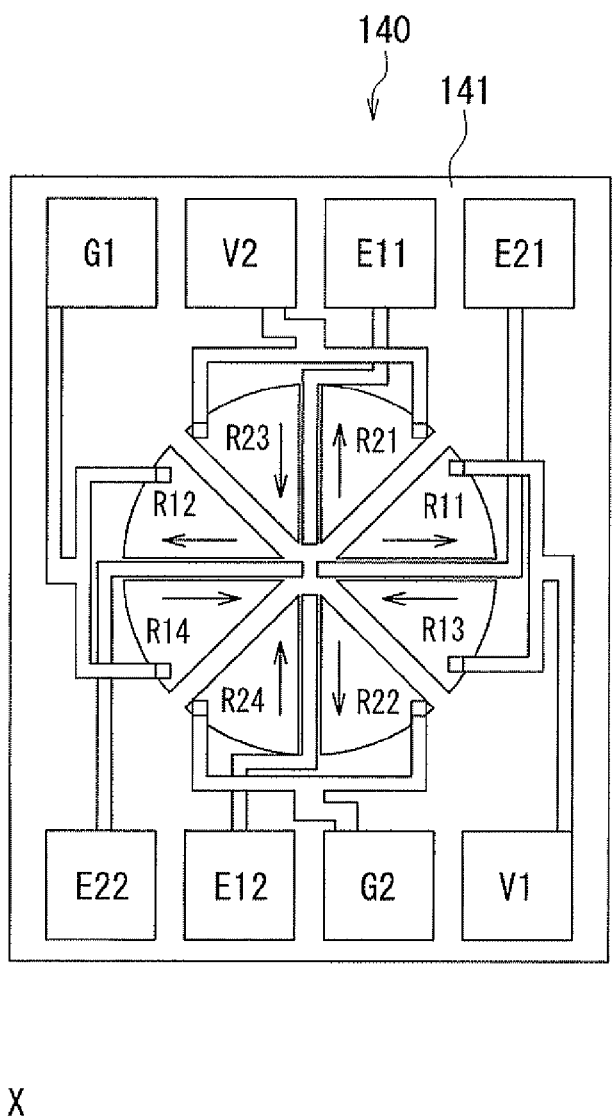
FIG. 17 is a plan view showing a unit that integrates two bridge circuits of a first detection unit of the magnetic sensor according to the second embodiment of the invention.

FIG. 17 is a plan view showing an example of a unit 140 that integrates the bridge circuits 14 and 16 of the first detection unit 10. The unit 140 includes a substrate 141, and the bridge circuits 14 and 16 provided on the substrate 141. The plurality of ports of the bridge circuits 14 and 16 are arranged on the substrate 141, near peripheral edges of the substrate 141. An MR element layout area of circular shape is provided on the substrate 141. The MR element layout area is circumferentially divided into eight sections. The MR elements R11 to R14 and R21 to R24 are located in the eight sections, respectively. Wiring for electrically connecting the plurality of MR elements to the plurality of ports is formed on the substrate 141. A unit that integrates the bridge circuits 24 and 26 of the second detection unit 20 can also be formed like the unit 140.

It should be noted that in the present embodiment, the first detection unit 10 and the second detection unit 20 are located in respective different positions. Depending on the installation precision of the detection units 10 and 20, the amount of interval between the first position P1 and the second position may deviate from a desired value, and the phase difference between the first detection angle θ1s and the second detection angle θ2s may thus deviate from a desired value, i.e., an odd number of times the electrical angle of 45°. The amount of deviation of the phase difference between the first detection angle θ1s and the second detection angle θ2s from its desired value will be represented by ±α. In the present embodiment, the value of ±α can be estimated from such factors as the phase difference between the peaks of the first detection angle θ1s and the second detection angle θ2s. Then, θs is calculated by using the following equation (5) instead of equation (1). This makes it possible to make a correction for the amount of deviation ±α for more accurate detection of the angle θ.

$$\theta s=(\theta 1s+\theta 2s+\pi/4\pm\alpha)/2 \quad (5)$$

The other configuration, operation, and effects of the present embodiment are the same as those of the first embodiment.

Third Embodiment

Figure 18:
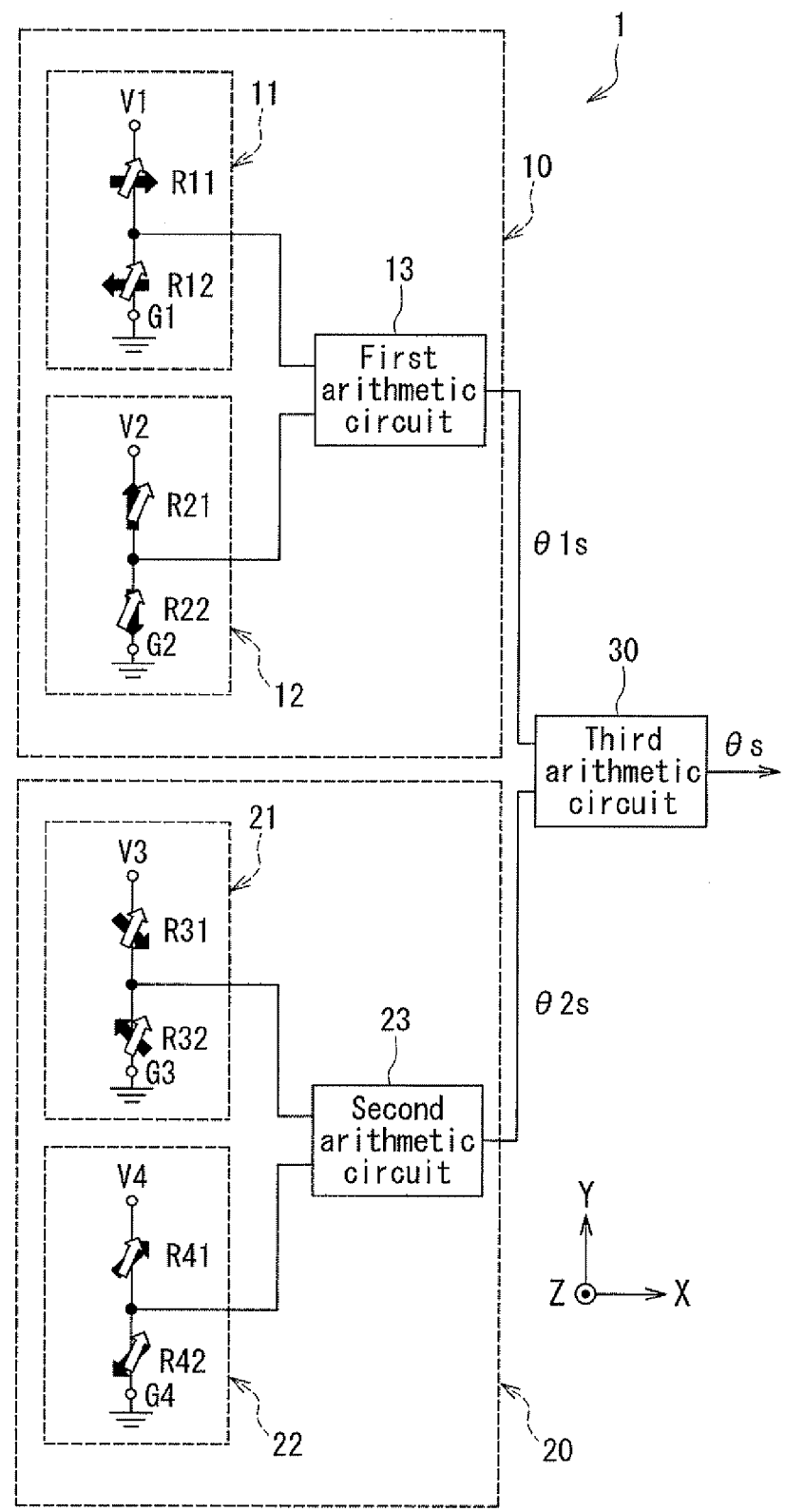
FIG. 18 is a circuit diagram showing the configuration of a magnetic sensor according to a third embodiment of the invention.

Next, a magnetic sensor according to a third embodiment of the invention will be described with reference to FIG. 18. FIG. 18 is a circuit diagram showing the configuration of the magnetic sensor 1 according to the present embodiment. In the magnetic sensor 1 according to the present embodiment, each of the detection circuits 11, 12, 21, and 22 includes a half bridge circuit instead of the Wheatstone bridge circuit, with no difference detector.

The detection circuit 11 has a pair of magnetic detection elements (MR elements) R11 and R12 that are connected in series and provided between a power supply port V1 and a ground port G1. The output signal of the detection circuit 11 is obtained from the junction between the magnetic detection elements R11 and R12. The detection circuit 12 has a pair of magnetic detection elements (MR elements) R21 and R22 that are connected in series and provided between a power supply port V2 and a ground port G2. The output signal of the detection circuit 12 is obtained from the junction between the magnetic detection elements R21 and R22.

The detection circuit 21 has a pair of magnetic detection elements (MR elements) R31 and R32 that are connected in series and provided between a power supply port V3 and a ground port G3. The output signal of the detection circuit 21 is obtained from the junction between the magnetic detection elements R31 and R32. The detection circuit 22 has a pair of magnetic detection elements (MR elements) R41 and R42 that are connected in series and provided between a power supply port V4 and a ground port G4. The output signal of the detection circuit 22 is obtained from the junction between the magnetic detection elements R41 and R42.

The directions of magnetization of the magnetization pinned layers in the magnetic detection elements (MR elements) R11, R12, R21, R22, R31, R32, R41, and R42 are the same as those of the magnetization pinned layers in the magnetic detection elements (MR elements) that are designated by the same respective symbols in FIG. 3.

The other configuration, operation, and effects of the present embodiment are the same as those of the first embodiment.

Fourth Embodiment

Figure 19:
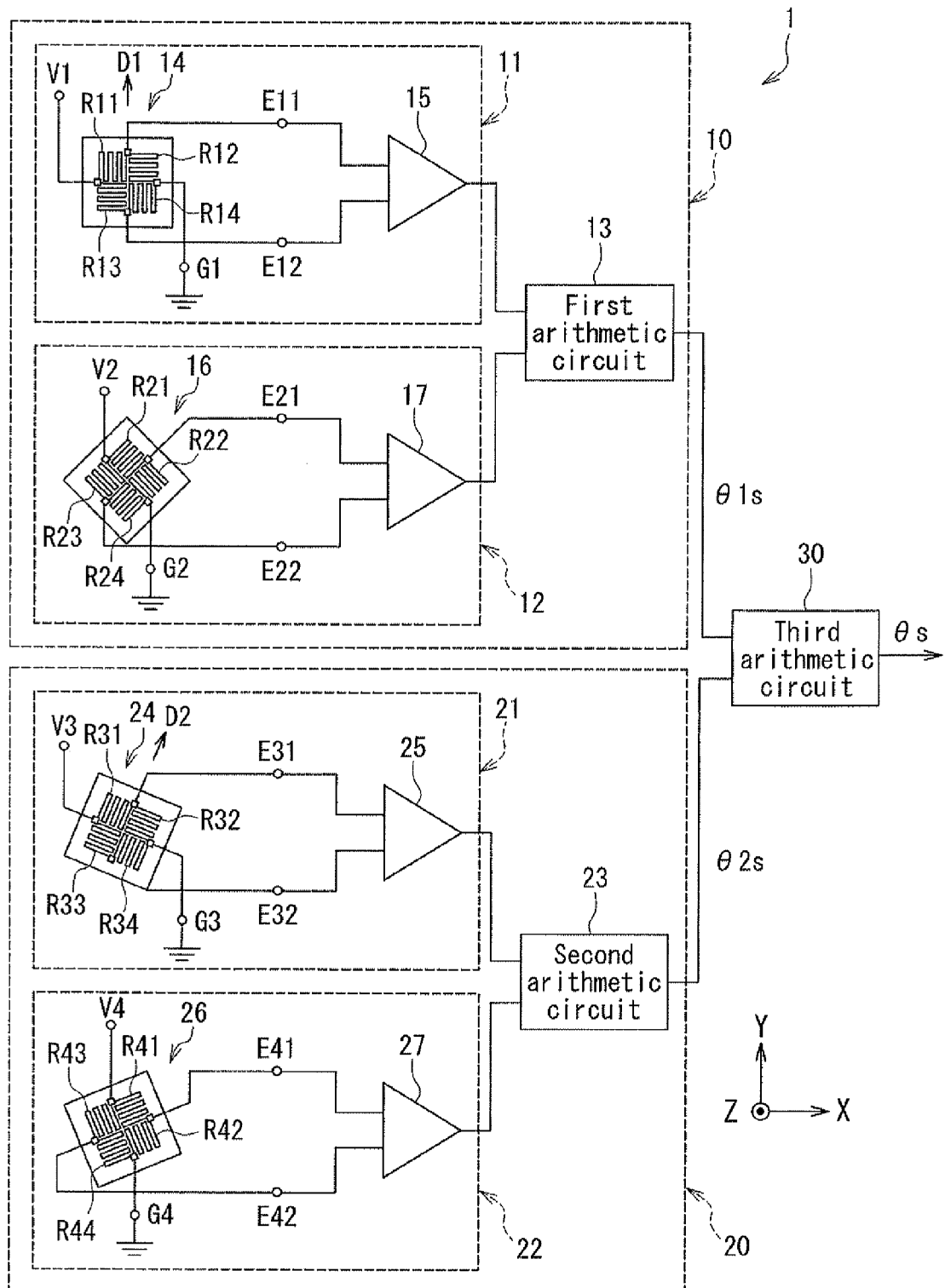
FIG. 19 is a circuit diagram showing the configuration of a magnetic sensor according to a fourth embodiment of the invention.

Next, a magnetic sensor according to a fourth embodiment of the invention will be described with reference to FIG. 19. FIG. 19 is a circuit diagram showing the configuration of the magnetic sensor 1 according to the present embodiment. The magnetic sensor 1 according to the present embodiment uses anisotropic magnetoresistive (AMR) elements for all the magnetic detection elements in the bridge circuits 14, 16, 24, and 26. In such a case, one rotation of the external magnetic field produces two periods of change of the output signals of the detection circuits 11, 12, 21, and 22. Consequently, the output signals of the detection circuits 11, 12, 21, and 22 of the present embodiment have a period equivalent to one half rotation of the external magnetic field, which is ½ the period of the output signals of the detection circuits 11, 12, 21, and 22 of the first embodiment. The error period in the present embodiment is also ½ the error period in the first embodiment.

In the present embodiment, the second direction D2, or the referential direction with respect to which the second detection unit 20 indicates the direction of the external magnetic field, is inclined 22.5° in the direction of rotation of the external magnetic field with respect to the first direction D1, which is the referential direction with respect to which the first detection unit 10 indicates the direction of the external magnetic field, within the XY plane.

In the present embodiment, the third arithmetic circuit 30 calculates θs by using not equation (1) but instead the following equation (6):

$$\theta s=(\theta 1s+\theta 2s+\pi/8)/2. \quad (6)$$

Note that in the present embodiment, the second direction D2 may be inclined −22.5° in the direction of rotation of the external magnetic field with respect to the first direction D1 within the XY plane. In such a case, the third arithmetic circuit 30 calculates θs by using not equation (6) but instead the following equation (7):

$$\theta s=(\theta 1s+\theta 2s-\pi/8)/2. \quad (7)$$

In the present embodiment, as in the first embodiment, the first detection angle θ1s and the second detection angle θ2s differ in phase by an odd number of times ½ of the error period. Consequently, the first angular error dθ1 and the second angular error dθ2 can be cancelled out to significantly reduce the angular error dθ that is included in the detected value θs.

In the present embodiment, when using the magnetic sensor 1 as in the examples shown in FIG. 11 to FIG. 14, the second direction D2 is inclined 22.5° in the direction of rotation of the external magnetic field with respect to the first direction D1 within the XY plane. When using the magnetic sensor 1 as in the example shown in FIG. 12, the angles that the respective directions D1 and D2 form with respect to the radial direction of the rotating body 71 are preferably equal in absolute value, i.e., 11.25° and −11.25°. Similarly, when using the magnetic sensor 1 as in the example shown in FIG. 14, the angles that the respective directions D1 and D2 form with respect to the direction orthogonal to the direction of movement of the moving body 72 are preferably equal in absolute value, i.e., 11.25° and −11.25°.

In the present embodiment, as in the second embodiment, the first detection unit 10 and the second detection unit 20 may be located in different positions so that the first position P1 and the second position P2 are different from each other. In such a case, the amount of interval between the first position P1 and the second position P2 shall be equivalent to an odd number of times ½ of the error period. Here, when the magnetic sensor 1 is to detect the direction of the external magnetic field that occurs from the outer periphery of the rotating body 71 shown in FIG. 15, the interval between the first position P1 and the second position P2 is an odd number of times the angle of rotation 11.25° of the rotating body 71. When the magnetic sensor 1 is to detect the direction of the external magnetic field that occurs from the outer periphery of the moving body 72 shown in FIG. 16, the interval between the first position P1 and the second position P2 is an odd number of times 1/16 of a pitch.

The other configuration, operation, and effects of the present embodiment are the same as those of the first embodiment. It should be noted that in the present embodiment, Hall elements may be used instead of the AMR elements.

Fifth Embodiment

Figure 20:
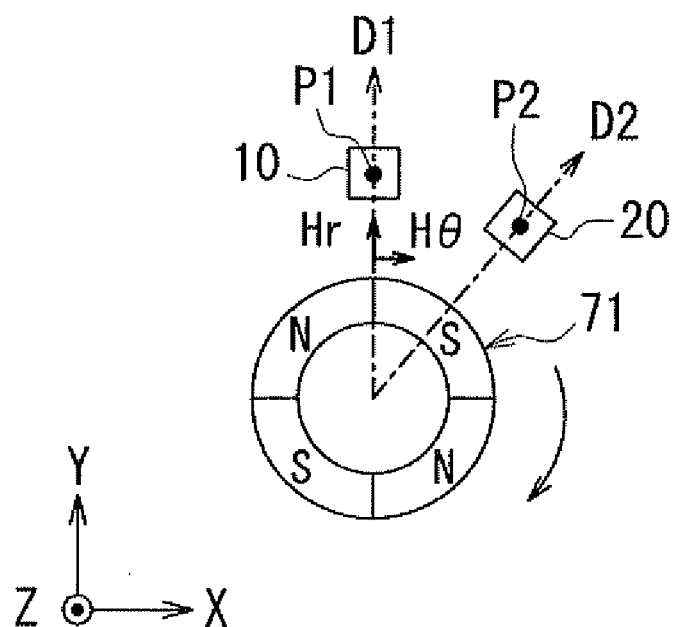
FIG. 20 is an explanatory diagram showing an example of usage of a magnetic sensor according to a fifth embodiment of the invention.
Figure 21:
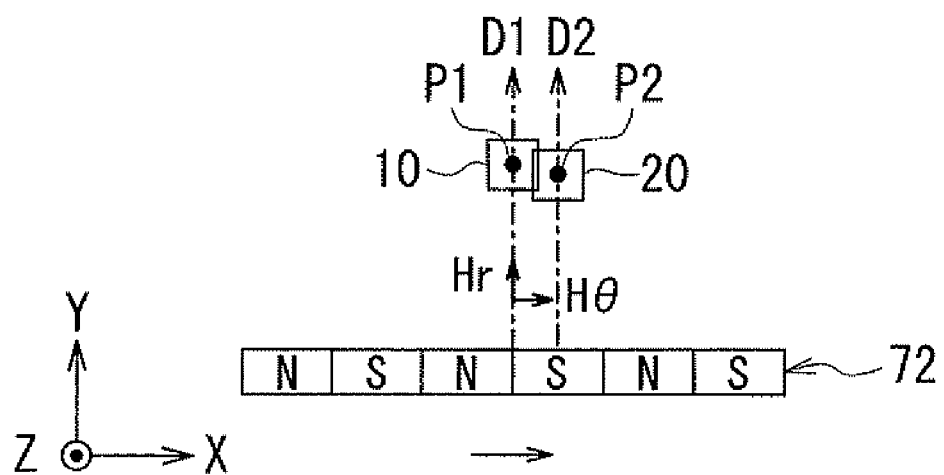
FIG. 21 is an explanatory diagram showing another example of usage of the magnetic sensor according to the fifth embodiment of the invention.

Next, a magnetic sensor according to a fifth embodiment of the invention will be described. The magnetic sensor 1 according to the present embodiment is suitable for reducing an angular error that occurs due to the external magnetic field. Initially, the reason for the occurrence of the angular error due to the external magnetic field will be described with reference to FIG. 20 to FIG. 22. FIG. 20 shows an example where the magnetic sensor 1 is used to detect the direction of the external magnetic field that occurs from the outer periphery of a rotating body 71. The rotating body 71 has one or more pairs of N and S poles that are arranged alternately in an annular configuration. In this example, the component of the external magnetic field in a radial direction of the rotating body 71 will be denoted by Hr. The component of the external magnetic field orthogonal to Hr within the XY plane will be denoted by Hθ. FIG. 21 shows an example where the magnetic sensor 1 is used to detect the direction of the external magnetic field that occurs from the outer periphery of a moving body 72. The moving body 72 has a plurality of pairs of N and S poles that are arranged alternately in a linear configuration, and moves in the direction of arrangement of the N and S poles. In this example, the component of the external magnetic field in a direction orthogonal to the direction of movement of the moving body 72 within the XY plane will be denoted by Hr. The component of the external magnetic field orthogonal to Hr within the XY plane will be denoted by Hθ.

Figure 22:
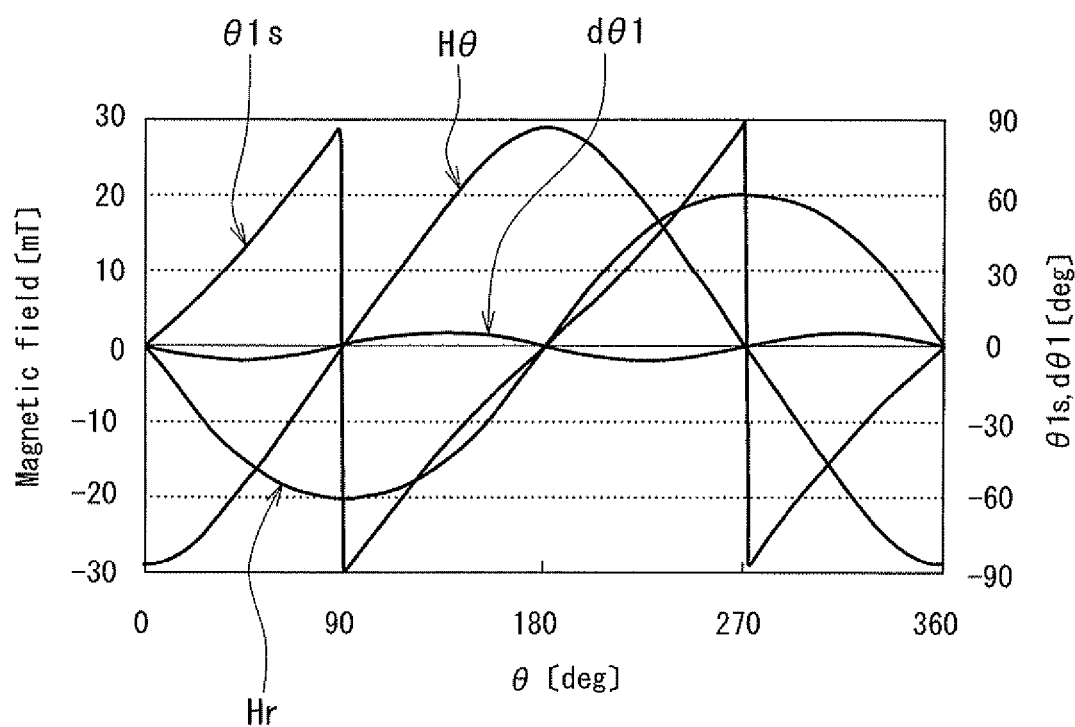
FIG. 22 is a waveform chart showing the relationship between the external magnetic field, a first detection angle, and a first angular error in the fifth embodiment of the invention.

Suppose, in the examples shown in FIG. 20 and FIG. 21, that the first detection unit 10 detects the direction of the external magnetic field to determine the first detection angle θ1s. FIG. 22 shows an example of the relationship among Hr, Hθ, θ1s, and the first angular error dθ1 in such a case. In FIG. 22, the horizontal axis indicates the angle θ that the direction DM of the external magnetic field MF forms with respect to the reference direction DR, and the vertical axis indicates Hr, H$\theta$, $\theta1s$, and d$\theta1$. In the example shown in FIG. 20 or FIG. 21, the direction of the external magnetic field and the intensity of a component of the external magnetic field in one direction sometimes fail to make a sinusoidal change. In such a case, the first detection angle $\theta1s$ includes a first angular error d$\theta1$. The first angular error d$\theta1$ here changes depending on the change of the direction of the external magnetic field. The error period of the first angular error d$\theta1$ is ½ the period of the rotation of the direction of the external magnetic field. Similarly, when the second detection unit 20 detects the direction of the external magnetic field to determine the second detection angle $\theta2s$, the second detection angle $\theta2s$ includes a second angular error d$\theta2$ that changes depending on the change of the direction of the external magnetic field.

Next, the configuration of the magnetic sensor 1 according to the present embodiment will be described with reference to FIG. 20 and FIG. 21. In the magnetic sensor 1 according to the present embodiment, the first position P1 where the first detection unit 10 detects the external magnetic field MF and the second position P2 where the second detection unit 20 detects the external magnetic field MF are different from each other. That is, in the present embodiment, the first detection unit 10 and the second detection unit 20 are located in respective different positions. The interval between the first position P1 and the second position P2 is equivalent to an odd number of times ½ of the error period. Such an interval is equivalent to an odd number of times ¼ of the period of the rotation of the direction of the external magnetic field. FIG. 20 and FIG. 21 show examples where the amount of interval between the first position P1 and the second position P2 is equivalent to ½ the error period.

In the example shown in FIG. 20, the first direction D1, or the referential direction with respect to which the first detection unit 10 indicates the direction of the external magnetic field, and the second direction D2, or the referential direction with respect to which the second detection unit 20 indicates the direction of the external magnetic field, are both set to radial directions of the rotating body 71. In the example shown in FIG. 21, the first direction D1 and the second direction D2 are both set to the direction orthogonal to the direction of movement of the moving body 72 within the XY plane. In these examples, the first detection angle $\theta1s$ and the second detection angle $\theta2s$ differ in phase by ¼ the period of the rotation of the direction of the external magnetic field (an electrical angle of 90°). In such examples, the third arithmetic circuit 30 calculates $\theta s$ by the following equation (8):

$$\theta s=(\theta1s+\theta2s+\pi/2)/2. \quad (8)$$

Figure 23:
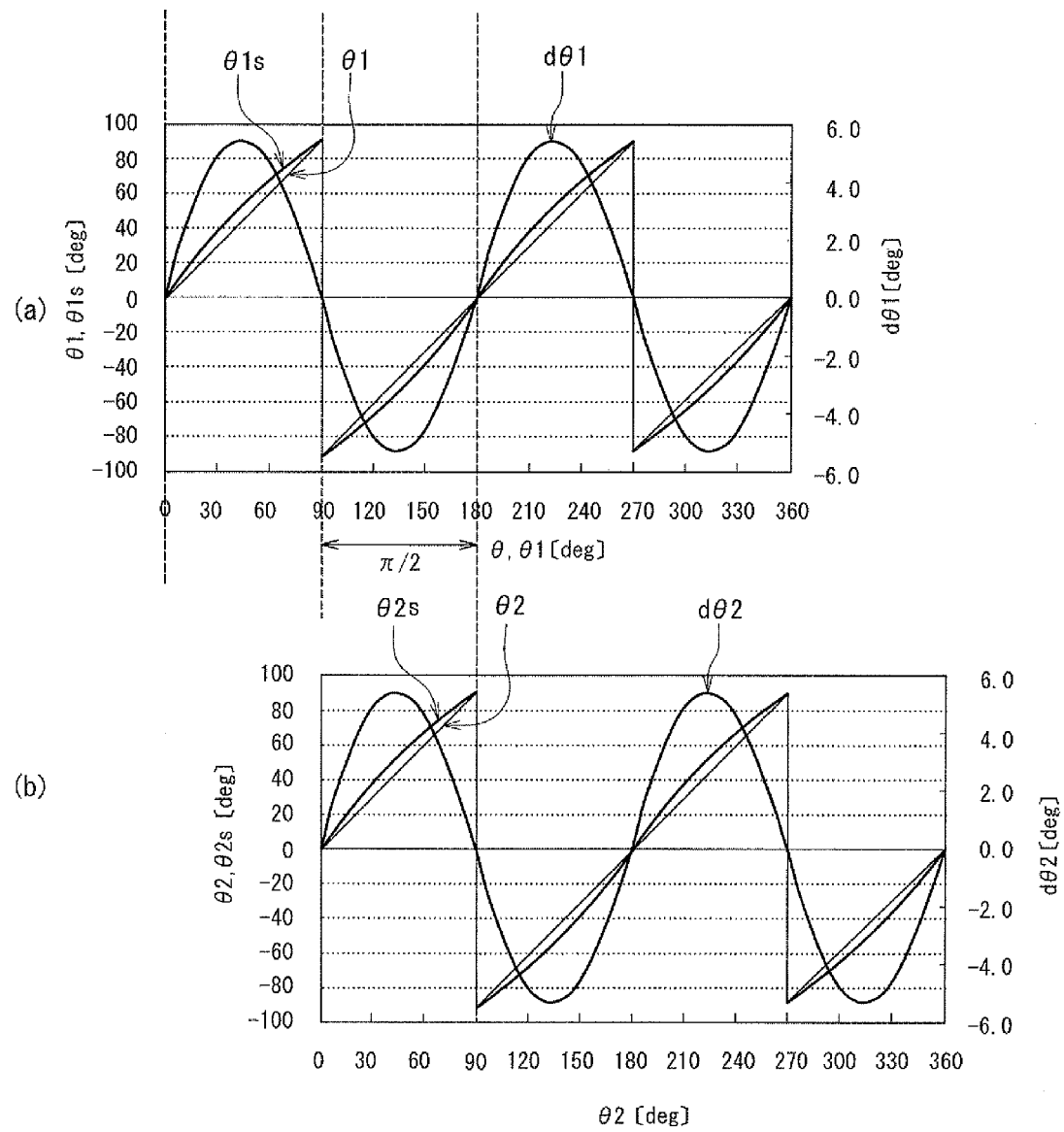
FIG. 23 is an explanatory diagram showing the operation of reducing an angular error in the fifth embodiment of the invention.

Next, with reference to FIG. 23 and FIG. 24, a description will be given of how the magnetic sensor 1 according to the present embodiment can be used to reduce the angular error that occurs due to the external magnetic field. Portion (a) of FIG. 23 shows the relationship between the first detection angle $\theta1s$ and the first angular error d$\theta1$. Portion (b) of FIG. 23 shows the relationship between the second detection angle $\theta2s$ and the second angular error d$\theta2$. In the example shown in FIG. 23, the first angular error d$\theta1$ and the second angular error d$\theta2$ have an amplitude of ±5.45°. In the present embodiment, the first position P1 and the second position P2 are given an interval therebetween equivalent to an odd number of times ½ of the error period (an electrical angle of 90°). The detected value $\theta s$ of the angle $\theta$ is calculated by using the first detection angle $\theta1s$ and the second detection angle $\theta2s$. When calculating the detected value $\theta s$, the first angular error d$\theta1$ and the second angular error d$\theta2$ are thus in opposite phases.

Consequently, the first angular error d$\theta1$ and the second angular error d$\theta2$ cancel each other out.

Figure 24:
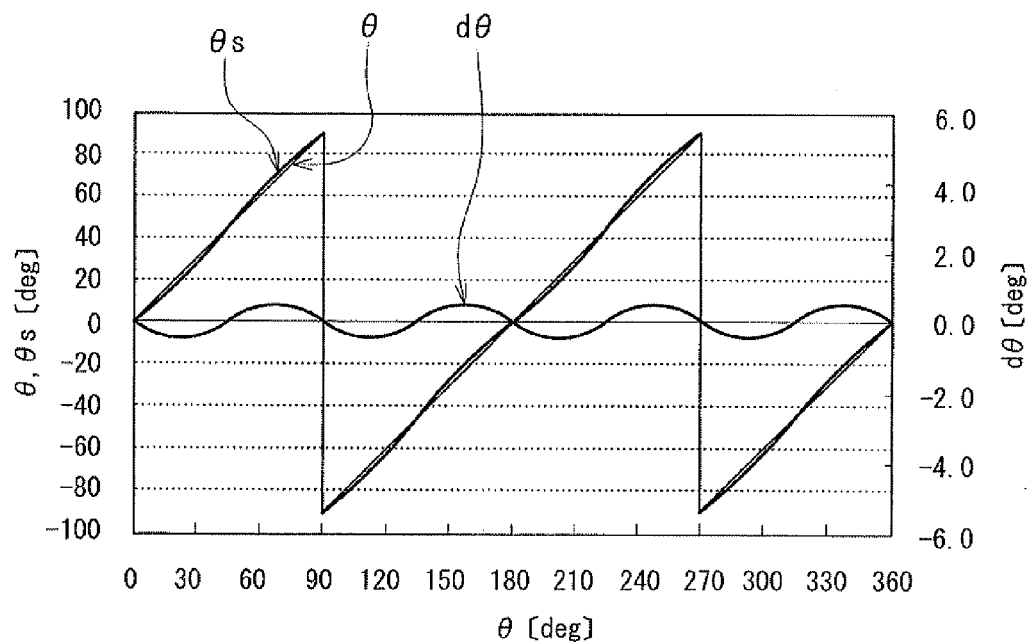
FIG. 24 is a waveform chart showing the relationship between a detected angle value and an angular error in the fifth embodiment of the invention.

FIG. 24 shows the relationship between the detected value $\theta s$ calculated as described above and an angular error d$\theta$ included in the detected value $\theta s$. As shown in FIG. 24, the angular error d$\theta$ is significantly smaller than the first angular error d$\theta1$ and the second angular error d$\theta2$. In the example shown in FIG. 24, the angular error d$\theta$ has an amplitude of ±0.6°.

It should be noted that the amount of interval between the first position P1 and the second position P2 is not limited to the amount equivalent to ½ the error period, and may be equivalent to any odd number of times ½ of the error period. In such a case, the first angular error d$\theta1$ and the second angular error d$\theta2$ can be cancelled out to significantly reduce the angular error d$\theta$ that is included in the detected value $\theta s$.

In the present embodiment, the phase difference between the first detection angle $\theta1s$ and the second detection angle $\theta2s$ is not limited to the electrical angle of 90°, and may be of any value. Assuming that the phase difference between the first detection angle $\theta1s$ and the second detection angle $\theta2s$ is $\beta$, the third arithmetic circuit 30 calculates $\theta s$ by the following equation (9):

$$\theta s=(\theta1s+\theta2s+\beta)/2. \quad (9)$$

The other configuration, operation, and effects of the present embodiment are the same as those of the first embodiment. It should be noted that in the present embodiment, the detection circuits 11, 12, 21, and 22 may be configured as in the third or fourth embodiment.

Sixth Embodiment

Next, a magnetic sensor according to a sixth embodiment of the invention will be described. The magnetic sensor 1 according to the present embodiment is capable of reducing both an angular error component that occurs due to the MR elements and an angular error component that occurs due to the external magnetic field.

Figure 25:
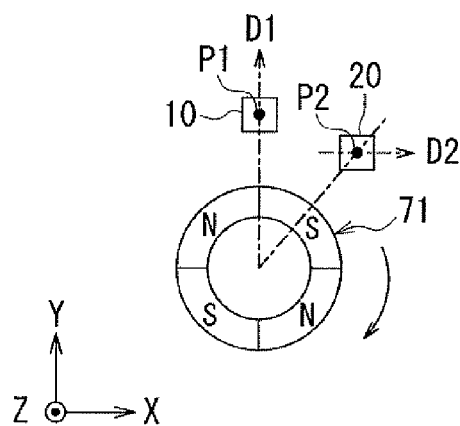
FIG. 25 is an explanatory diagram showing an example of usage of a magnetic sensor according to a sixth embodiment of the invention.
Figure 26:
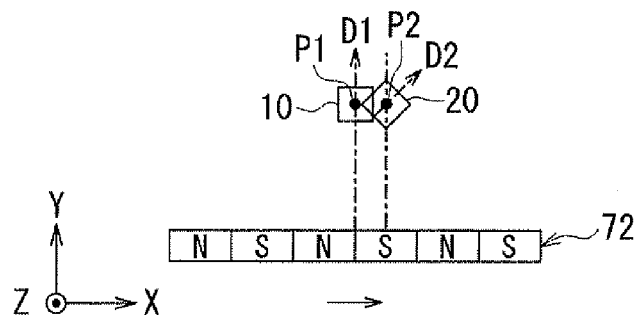
FIG. 26 is an explanatory diagram showing another example of usage of the magnetic sensor according to the sixth embodiment of the invention.

With reference to FIG. 25 and FIG. 26, a description will initially be given that the angular error may sometimes include an angular error component that occurs due to the MR elements and an angular error component that occurs due to the external magnetic field. FIG. 25 shows an example where the magnetic sensor 1 is used to detect the direction of the external magnetic field that occurs from the outer periphery of the rotating body 71 as in the example shown in FIG. 20. FIG. 26 shows an example where the magnetic sensor 1 is used to detect the direction of the external magnetic field that occurs from the outer periphery of the moving body 72 as in the example shown in FIG. 21. In these examples, as has been described in the fifth embodiment, each of the first and second detection angles $\theta1s$ and $\theta2s$ can include an angular error component that occurs due to the external magnetic field. As has been described in the first embodiment, each of the first and second detection angles $\theta1s$ and $\theta2s$ can also include an angular error component that occurs due to the MR elements.

For such reasons, each of the first angular error d$\theta1$ of the first detection angle $\theta1s$ and the second angular error d$\theta2$ of the second detection angle $\theta2s$ may sometimes include a first error component that occurs due to the external magnetic field and a second error component that occurs due to the MR elements. The first error component changes depending on the change of the direction of the external magnetic field, at a first error period which is ½ the period of the rotation of the direction of the external magnetic field, i.e., an electrical angle of 180°. The second error component changes at a second error period which is ¼ the period of the output signals of the detection circuits 11, 12, 21, and 22, i.e., an electrical angle of 90°.

Next, the configuration of the magnetic sensor 1 according to the present embodiment will be described. In the magnetic sensor 1 according to the present embodiment, like the fifth embodiment, the first detection unit 10 and the second detection unit 20 are located in different positions so that the first position P1 and the second position P2 are different from each other. The interval between the first position P1 and the second position P2 is equivalent to an odd number of times ½ of the first error period (an electrical angle of 90°). Such an interval is equivalent to an odd number of times ¼ of the period of the rotation of the direction of the external magnetic field. FIG. 25 and FIG. 26 show examples where the amount of interval between the first position P1 and the second position P2 is equivalent to ½ the first error period (an electrical angle of 90°).

In the present embodiment, the first detection angle θ1s and the second detection angle θ2s are given a difference in phase by an odd number of times ½ of the second error period (an electrical angle of 45°). Specifically, in the example shown in FIG. 25, the second direction D2 is inclined 45° with respect to the radial direction of the rotating body 71 within the XY plane. This gives the first detection angle θ1s and the second detection angle θ2s a phase difference of 135° in electrical angle which is three times ½ of the second error period (an electrical angle of 45°). In the example shown in FIG. 26, the second direction D2 is inclined 45° with respect to the direction orthogonal to the direction of movement of the moving body 72 within the XY plane. This also gives the first detection angle θ1s and the second detection angle θ2s a phase difference of 135° in electrical angle which is three times ½ of the second error period (an electrical angle of 45°).

In the examples shown in FIG. 25 and FIG. 26, the third arithmetic circuit 30 calculates θs by the following equation (10):

$$\theta s = (\theta 1s + \theta 2s + \pi/2 + \pi/4)/2. \quad (10)$$

As has been described, in the present embodiment, the first position P1 and the second position P2 are given an interval therebetween equivalent to an odd number of times ½ of the first error period (an electrical angle of 90°). When calculating the detected value θs, the first error component of the first angular error dθ1 and the first error component of the second angular error dθ2 are thus in opposite phases. Consequently, the first error component of the first angular error dθ1 and the first error component of the second angular error dθ2 cancel each other out.

Moreover, in the present embodiment, the first detection angle θ1s and the second detection angle θ2s are given a difference in phase by an odd number of times ½ of the second error period (an electrical angle of 45°). When calculating the detected value θs, the second error component of the first angular error dθ1 and the second error component of the second angular error dθ2 are thus in opposite phases. Consequently, the second error component of the first angular error dθ1 and the second error component of the second angular error dθ2 cancel each other out.

With the operation described above, it is possible according to the present embodiment to reduce both the angular error component that occurs due to the MR elements and the angular error component that occurs due to the external magnetic field.

The other configuration, operation, and effects of the present embodiment are the same as those of the first or fifth embodiment. It should be noted that in the present embodiment, the detection circuits 11, 12, 21, and 22 may be configured as in the third or fourth embodiment.

Seventh Embodiment

Next, a magnetic sensor according to a seventh embodiment of the invention will be described. Like the sixth embodiment, the magnetic sensor 1 according to the present embodiment is capable of reducing both the angular error component that occurs due to the MR elements and the angular error component that occurs due to the external magnetic field.

Figure 27:
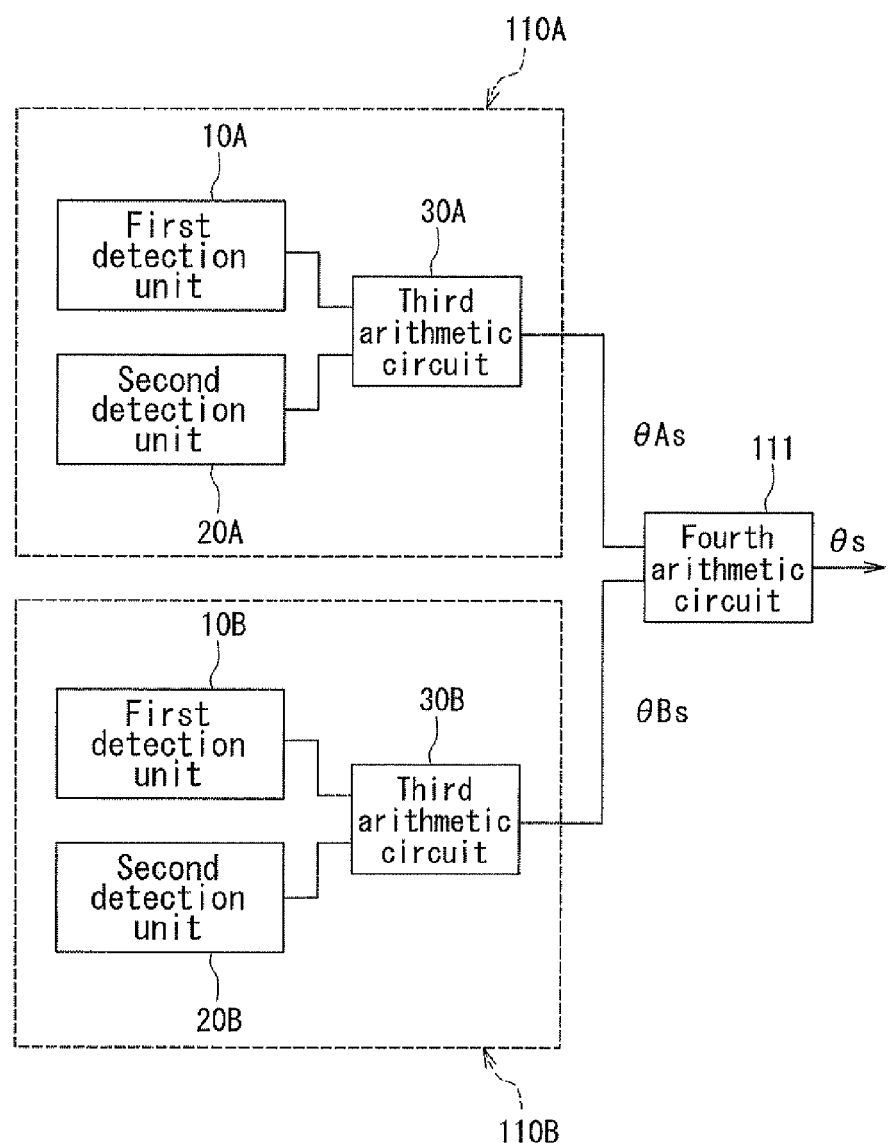
FIG. 27 is a block diagram showing the configuration of a magnetic sensor according to a seventh embodiment of the invention.

FIG. 27 is a block diagram showing the configuration of the magnetic sensor 1 according to the present embodiment. As shown in FIG. 27, the magnetic sensor 1 according to the present embodiment includes first and second composite detection units 110A and 110B and a fourth arithmetic circuit 111. The fourth arithmetic circuit 111 can be implemented by a microcomputer, for example.

The composite detection units 110A and 110B each have the same configuration as that of the magnetic sensor 1 of the fifth embodiment. Specifically, the composite detection unit 110A includes a first detection unit 10A, a second detection unit 20A, and a third arithmetic circuit 30A that are configured the same as the first detection unit 10, the second detection unit 20, and the third arithmetic circuit 30, respectively. Similarly, the composite detection unit 110B includes a first detection unit 10B, a second detection unit 20B, and a third arithmetic circuit 30B that are configured the same as the first detection unit 10, the second detection unit 20, and the third arithmetic circuit 30, respectively.

The first composite detection unit 110A determines the detected value θAs of the angle θA that the direction of an external magnetic field in a first reference position PRA forms with respect to a first reference direction DRA. Similarly, the second composite detection unit 110B determines the detected value θBs of the angle θB that the direction of the external magnetic field in a second reference position PRB forms with respect to a second reference direction DRB. Based on the detected values θAs and θBs determined by the composite detection units 110A and 110B, the fourth arithmetic circuit 111 calculates the detected value θs of the angle θ that the direction of the external magnetic field in a reference position PR forms with respect to a reference direction DR.

The relative positioning of the detection units 10A and 20A is the same as that of the detection units 10 and 20 of the fifth embodiment. The relative positioning of the detection units 10B and 20B is also the same as that of the detection units 10 and 20 of the fifth embodiment. In the present embodiment, the detection units 10B and 20B are located in positions displaced from the detection units 10A and 20A as much as ⅛ the period of the rotation of the direction of the external magnetic field, i.e., as much as an electrical angle of 45°.

Figure 28:
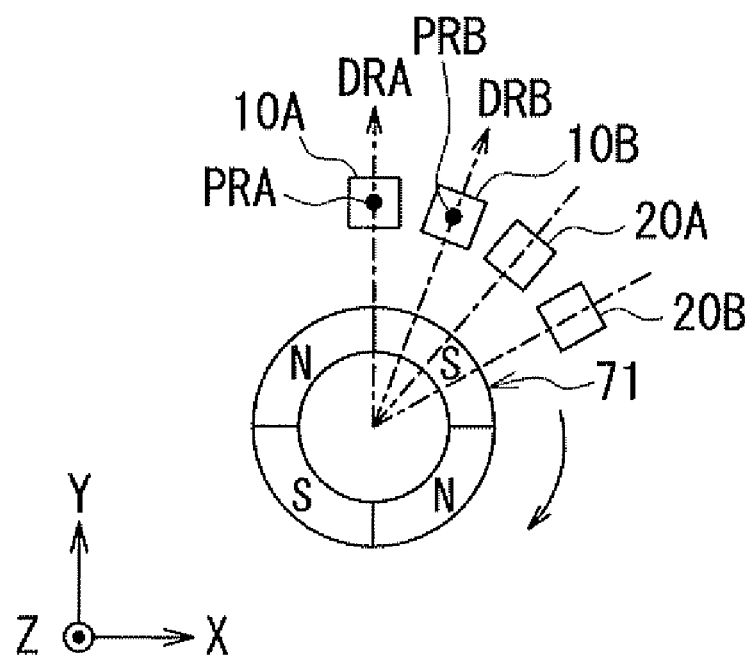
FIG. 28 is an explanatory diagram showing an example of usage of the magnetic sensor according to the seventh embodiment of the invention.

FIG. 28 shows an example where the magnetic sensor 1 is used to detect the direction of the external magnetic field that occurs from the outer periphery of the rotating body 71 as in the example shown in FIG. 20. In this example, the detection units 10A and 20A are located in the same positions as the detection units 10 and 20 shown in FIG. 20. The detection units 10B and 20B are located in positions displaced from the detection units 10A and 20A as much as ⅛ the period of the rotation of the direction of the external magnetic field (an electrical angle of 45°), i.e., as much as 22.5° in terms of the rotation angle of the rotating body 71. In this example, the referential directions with respect to which the detection units 10A, 20A, 10B, and 20B indicate the direction of the external magnetic field are all set to radial directions of the rotating body 71.

Figure 29:
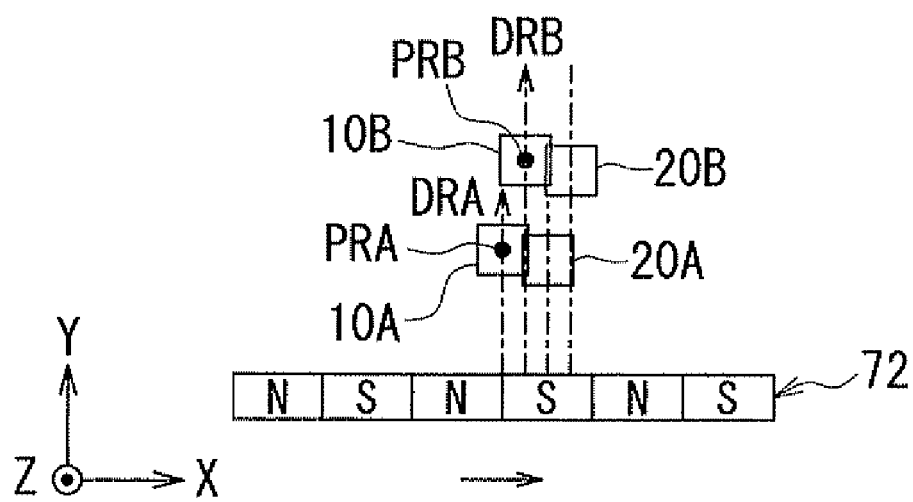
FIG. 29 is an explanatory diagram showing another example of usage of the magnetic sensor according to the seventh embodiment of the invention.

FIG. 29 shows an example where the magnetic sensor 1 is used to detect the direction of the external magnetic field that occurs from the outer periphery of the moving body 72 as in the example shown in FIG. 21. In this example, the detection units 10A and 20A are located in the same positions as the detection units 10 and 20 shown in FIG. 21. The detection units 10B and 20B are located in positions displaced from the detection units 10A and 20A as much as ⅛ the period of the rotation of the direction of the external magnetic field (an electrical angle of 45°), i.e., as much as one-eighth pitch of the moving body 72. In this example, the referential directions with respect to which the detection units 10A, 20A, 10B, and 20B indicate the direction of the external magnetic field are all set to a direction orthogonal to the direction of movement of the moving body 72 within the XY plane.

In the examples shown in FIG. 28 and FIG. 29, the detected value θAs and the detected value θBs differ in phase by an electrical angle of 45°.

Next, the operation and effects of the magnetic sensor 1 according to the present embodiment will be described with reference to FIG. 30 and FIG. 31. In the present embodiment, as in the sixth embodiment, the angular errors in the detection angles of the detection units 10A, 20A, 10B, and 20B shall include both a first error component that occurs due to the external magnetic field and a second error component that occurs due to the MR elements.

The first composite detection unit 110A determines the detected value θAs of the angle θA that the direction of the external magnetic field in the first reference position PRA forms with respect to the first reference direction DRA. The second composite detection unit 110B determines the detected value θBs of the angle θB that the direction of the external magnetic field in the second reference position PRB forms with respect to the second reference direction DRB. The first error components of the detected values θAs and θBs are reduced by the principle described in the fifth embodiment. The detected values θAs and θBs still have the second error components, however.

In the present embodiment, the fourth arithmetic circuit 111 calculates the detected value θs of the angle θ that the direction of the external magnetic field in the reference position PR forms with respect to the reference direction DR, based on the detected values θAs and θBs determined by the composite detection units 110A and 110B. Here, the detected value θAs and the detected value θBs differ in phase by ½ the second error period (an electrical angle of 45°). The fourth arithmetic circuit 111 calculates θs by the following equation (11):

$$\theta s = (\theta As + \theta Bs + \pi/4)/2. \tag{11}$$

In the present embodiment, when calculating the detected value θs, the second error component of the detected value θAs and the second error component of the detected value θBs are in opposite phases. Consequently, the second error component of the detected value θAs and the second error component of the detected value θBs cancel each other out. This will be described with reference to FIG. 30 and FIG. 31.

Figure 30:
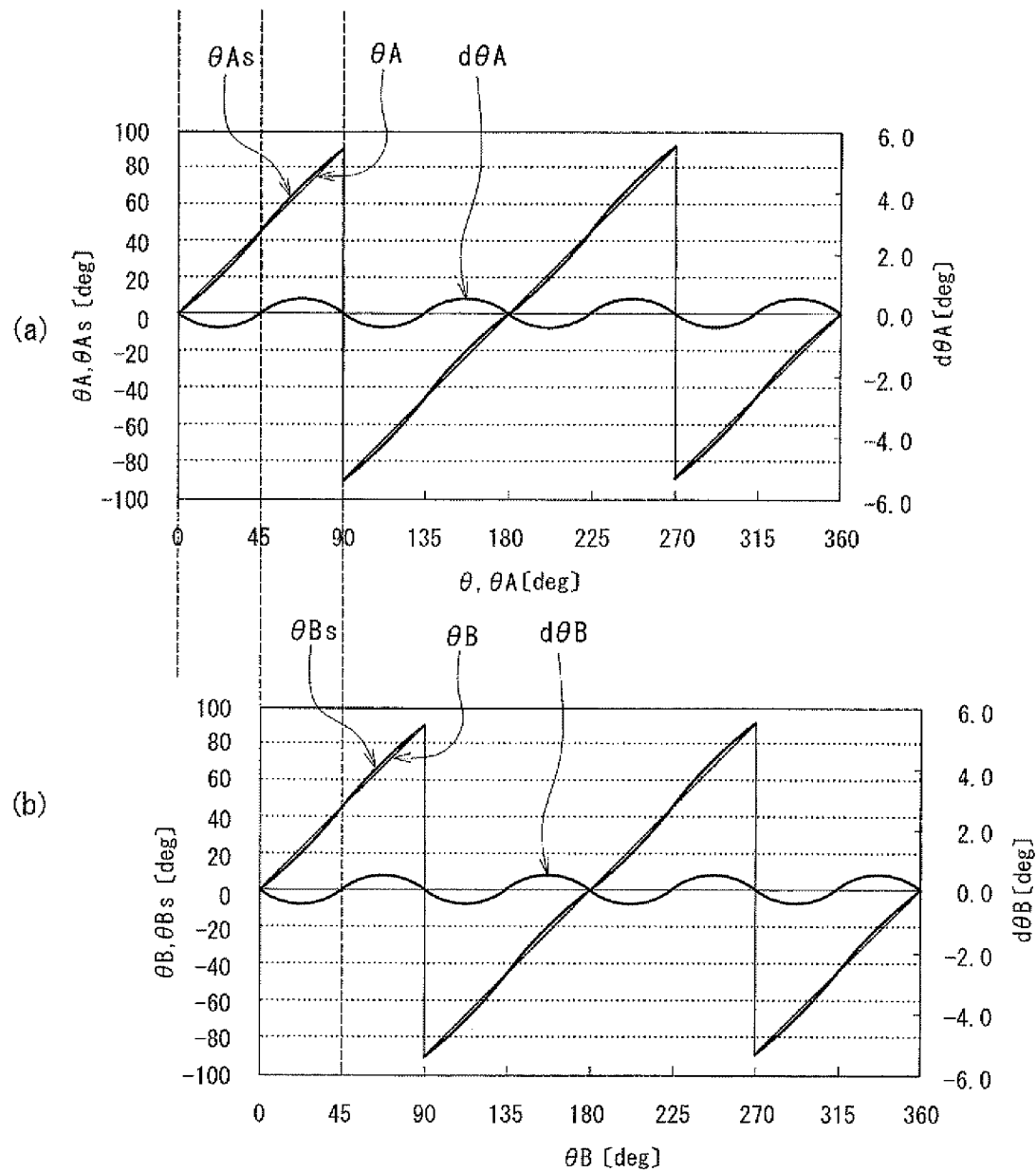
FIG. 30 is an explanatory diagram showing the operation of reducing an angular error in the seventh embodiment of the invention.

Portion (a) of FIG. 30 shows the relationship between the detected value θAs and an angular error dθA included therein. Portion (b) of FIG. 30 shows the relationship between the detected value θBs and an angular error dθB included therein. The major components of the angular errors dθA and dθB are the second error components. The periods of the angular errors dθA and dθB therefore coincide with the second error period (an electrical angle of 90°). In the example shown in FIG. 30, the angular errors dθA and dθB have an amplitude of ±0.6°. In the present embodiment, as mentioned above, the detected value θAs and the detected value θBs differ in phase by ½ the second error period (an electrical angle of 45°). When calculating the detected value θs, the angular error dθA and the angular error dθB are thus in opposite phases. Consequently, the angular error dθA and the angular error dθB cancel each other out.

Figure 31:
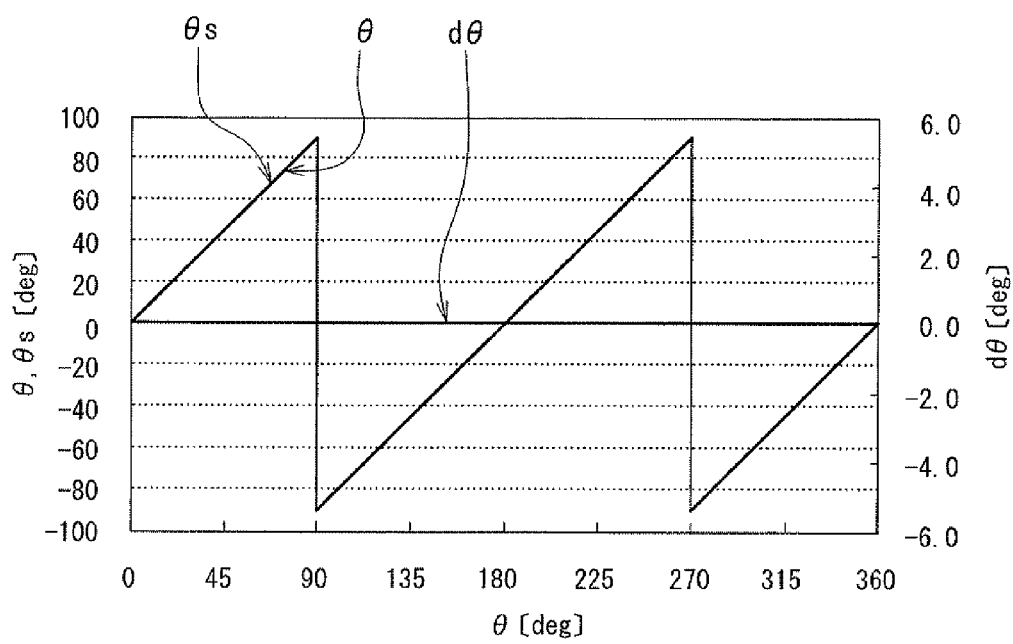
FIG. 31 is a waveform chart showing the relationship between a detected angle value and an angular error in the seventh embodiment of the invention.

FIG. 31 shows the relationship between the detected value θs calculated as described above and an angular error dθ included in the detected value θs. As shown in FIG. 31, the angular error dθ is significantly smaller than the angular errors dθA and dθB. In the example shown in FIG. 31, the angular error dθ has an amplitude of ±0.09°. It should be noted that the phase difference between the detected value θAs and the detected value θBs is not limited to ½ of the second error period, and may be any odd number of times ½ of the second error period.

With the operation described above, it is possible according to the present embodiment to reduce both the angular error component that occurs due to the MR elements and the angular error component that occurs due to the external magnetic field.

The other configuration, operation, and effects of the present embodiment are the same as those of the first or fifth embodiment. It should be noted that in the present embodiment, the detection circuits may be configured as in the third or fourth embodiment.

Eighth Embodiment

Next, a magnetic sensor according to an eighth embodiment of the invention will be described. Like the sixth and seventh embodiments, the magnetic sensor 1 according to the present embodiment is capable of reducing both the angular error component that occurs due to the MR elements and the angular error component that occurs due to the external magnetic field.

Like the seventh embodiment, the magnetic sensor 1 according to the present embodiment includes first and second composite detection units 110A and 110B and a fourth arithmetic circuit 111. The basic configuration of the magnetic sensor 1 according to the present embodiment is as shown in FIG. 27. As will be described below, however, the composite detection units 110A and 110B of the present embodiment are different from the composite detection units 110A and 110B of the seventh embodiment in some respects.

The composite detection units 110A and 110B of the present embodiment each have the same configuration as that of the magnetic sensor 1 according to the fifth embodiment. Specifically, the composite detection unit 110A includes a first detection unit 10A, a second detection unit 20A, and a third arithmetic circuit 30A that are configured the same as the first detection unit 10, the second detection unit 20, and the third arithmetic circuit 30, respectively. Similarly, the composite detection unit 110B includes a first detection unit 10B, a second detection unit 20B, and a third arithmetic circuit 30B that are configured the same as the first detection unit 10, the second detection unit 20, and the third arithmetic circuit 30, respectively.

The first composite detection unit 110A determines the detected value θAs of the angle θA that the direction of the external magnetic field in a first reference position PRA forms with respect to a first reference direction DRA. Similarly, the second composite detection unit 110B determines the detected value θBs of the angle θB that the direction of the external magnetic field in a second reference position PRB forms with respect to a second reference direction DRB. Based on the detected values θAs and θBs determined by the composite detection units 110A and 110B, the fourth arithmetic circuit 111 calculates the detected value θs of the angle θ that the direction of the external magnetic field in a reference position PR forms with respect to a reference direction DR.

The relative positioning of the detection units 10A and 20A is the same as that of the detection units 10 and 20 of the first embodiment. The relative positioning of the detection units 10B and 20B is also the same as that of the detection units 10 and 20 of the first embodiment. In the present embodiment, the detection units 10B and 20B are located in positions displaced from the detection units 10A and 20A as much as ¼ the period of the rotation of the direction of the external magnetic field, i.e., as much as an electrical angle of 90°.

Figure 32:
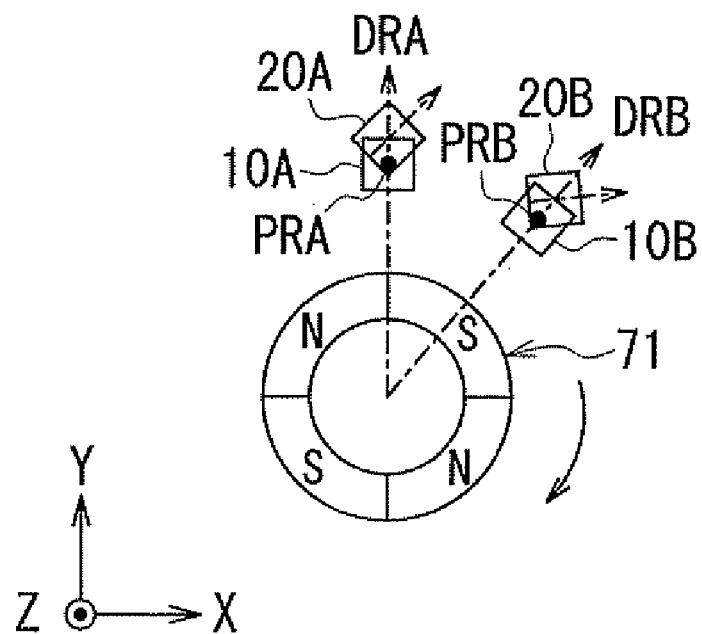
FIG. 32 is an explanatory diagram showing an example of usage of a magnetic sensor according to an eighth embodiment of the invention.

FIG. 32 shows an example where the magnetic sensor 1 is used to detect the direction of the external magnetic field that occurs from the outer periphery of the rotating body 71 as in the example shown in FIG. 11. In this example, the detection units 10A and 20A are located in the same positions as the detection units 10 and 20 shown in FIG. 11. The detection units 10B and 20B are located in positions displaced from the detection units 10A and 20A as much as ¼ the period of the rotation of the direction of the external magnetic field (an electrical angle of 90°), i.e., as much as 45° in terms of the rotation angle of the rotating body 71.

In the example shown in FIG. 32, the first direction of each of the detection units 10A and 10B is set to a radial direction of the rotating body 71. The second direction of the detection unit 20A is inclined 45° in the direction of rotation of the external magnetic field with respect to the first direction of the detection unit 10A within the XY plane. Similarly, the second direction of the detection unit 20B is inclined 45° in the direction of rotation of the external magnetic field with respect to the first direction of the detection unit 10B within the XY plane. Note that the detection units 10A and 20A may be located in the same positions as the detection units 10 and 20 shown in FIG. 12. In such a case, the detection units 10B and 20B are located in positions displaced from the detection units 10A and 20A as much as ¼ the period of the rotation of the direction of the external magnetic field (an electrical angle of 90°), i.e., as much as 45° in terms of the rotation angle of the rotating body 71.

Figure 33:
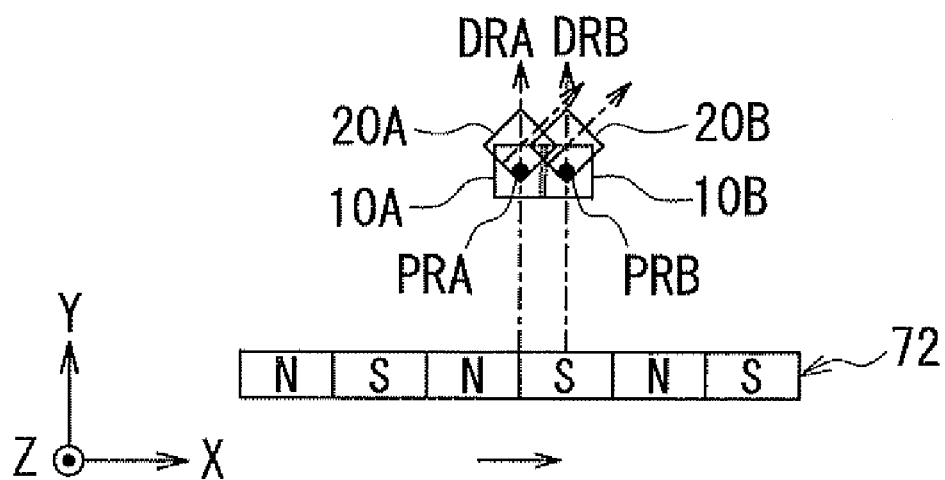
FIG. 33 is an explanatory diagram showing another example of usage of the magnetic sensor according to the eighth embodiment of the invention.

FIG. 33 shows an example where the magnetic sensor 1 is used to detect the direction of the external magnetic field that occurs from the outer periphery of the moving body 72 as in the example shown in FIG. 13. In this example, the detection units 10A and 20A are located in the same positions as the detection units 10 and 20 shown in FIG. 13. The detection units 10B and 20B are located in positions displaced from the detection units 10A and 20A as much as ¼ the period of the rotation of the direction of the external magnetic field (an electrical angle of 90°), i.e., as much as one-quarter pitch of the moving body 72. In this example, the first direction of each of the detection units 10A and 10B is set to a direction orthogonal to the direction of movement of the moving body 72 within the XY plane. The second direction of the detection unit 20A is inclined 45° in the direction of rotation of the external magnetic field with respect to the first direction of the detection unit 10A within the XY plane. Similarly, the second direction of the detection unit 20B is inclined 45° in the direction of rotation of the external magnetic field with respect to the first direction of the detection unit 10B within the XY plane. Note that the detection units 10A and 20A may be located in the same positions as the detection units 10 and 20 shown in FIG. 14. In such a case, the detection units 10B and 20B are located in positions displaced from the detection units 10A and 20A as much as ¼ the period of the rotation of the direction of the external magnetic field (an electrical angle of 90°), i.e., as much as one-quarter pitch of the moving body 72.

In the examples shown in FIG. 32 and FIG. 33, the detected value θAs and the detected value θBs differ in phase by an electrical angle of 90°.

Next, the operation and effects of the magnetic sensor 1 according to the present embodiment will be described with reference to FIG. 34 and FIG. 35. In the present embodiment, as in the sixth and seventh embodiments, the angular errors in the detection angles of the detection units 10A, 20A, 10B, and 20B shall include both a first error component that occurs due to the external magnetic field and a second error component that occurs due to the MR elements.

The first composite detection unit 110A determines the detected value θAs of the angle θA that the direction of the external magnetic field in the first reference position PRA forms with respect to the first reference direction DRA. The second composite detection unit 110B determines the detected value θBs of the angle θB that the direction of the external magnetic field in the second reference position PRB forms with respect to the second reference direction DRB. The second error components of the detected values θAs and θBs are reduced by the principle described in the first embodiment. The detected values θAs and θBs still have the first error components, however.

In the present embodiment, the fourth arithmetic circuit 111 calculates the detected value θs of the angle θ that the direction of the external magnetic field in the reference position PR forms with respect to the reference direction DR, based on the detected values θAs and θBs determined by the composite detection units 110A and 110B. Here, the detected value θAs and the detected value θBs differ in phase by ½ the first error period (an electrical angle of 90°). The fourth arithmetic circuit 111 calculates θs by the following equation (12):

$$\theta s=(\theta As+\theta Bs+\pi/2)/2. \tag{12}$$

In the present embodiment, when calculating the detected value θs, the first error component of the detected value θAs and the first error component of the detected value θBs are in opposite phases. Consequently, the first error component of the detected value θAs and the first error component of the detected value θBs cancel each other out. This will be described with reference to FIG. 34 and FIG. 35.

Figure 34:
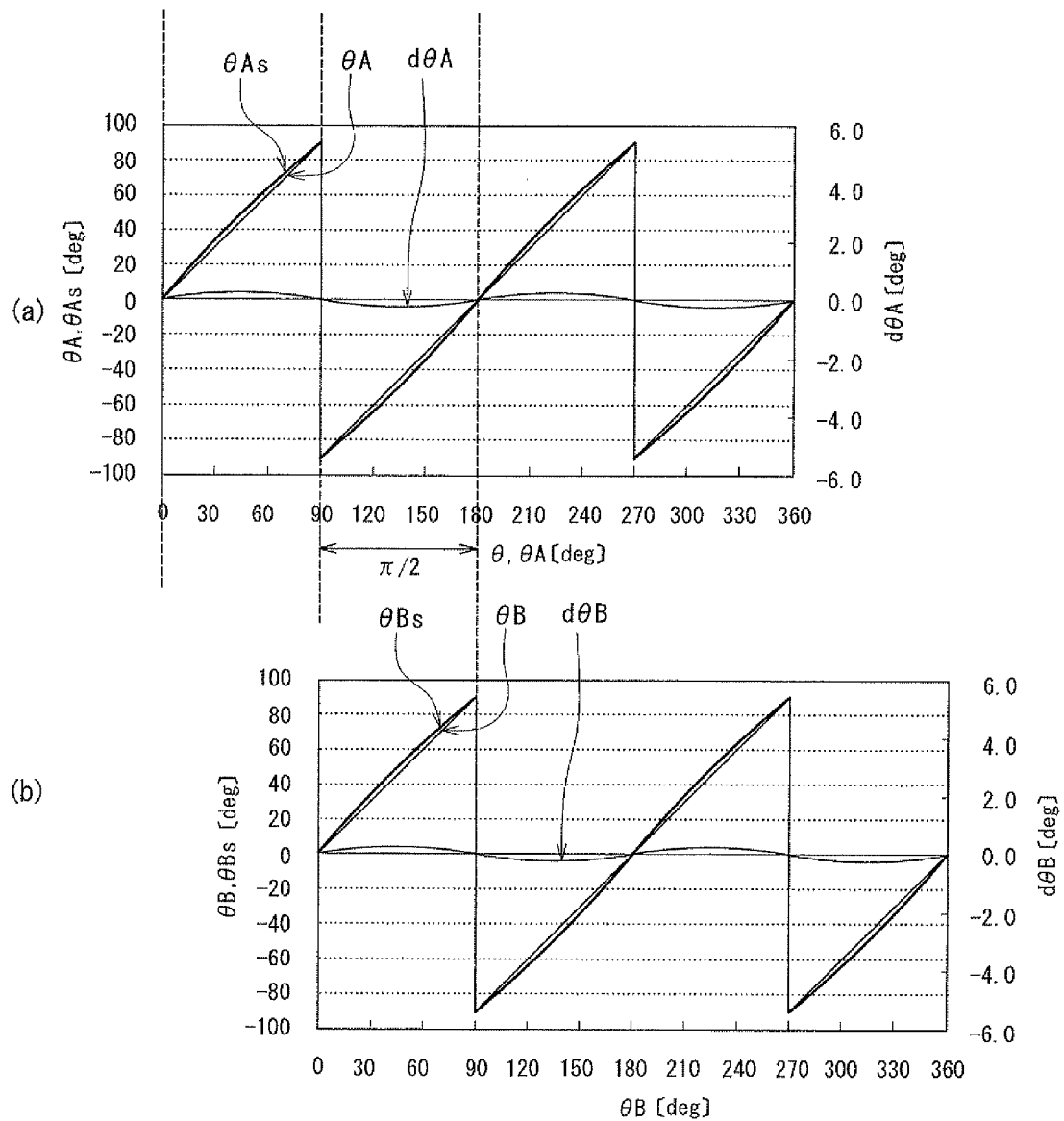
FIG. 34 is an explanatory diagram showing the operation of reducing an angular error in the eighth embodiment of the invention.

Portion (a) of FIG. 34 shows the relationship between the detected value θAs and the angular error dθA included therein. Portion (b) of FIG. 34 shows the relationship between the detected value θBs and the angular error dθB included therein. The major components of the angular errors dθA and dθB are the first error components. The periods of the angular errors dθA and dθB therefore coincide with the first error period (an electrical angle of 180°). In the present embodiment, as mentioned above, the detected value θAs and the detected value θBs differ in phase by ½ the first error period (an electrical angle of 90°). When calculating the detected value θs, the angular error dθA and the angular error dθB are thus in opposite phases. Consequently, the angular error dθA and the angular error dθB cancel each other out.

Figure 35:
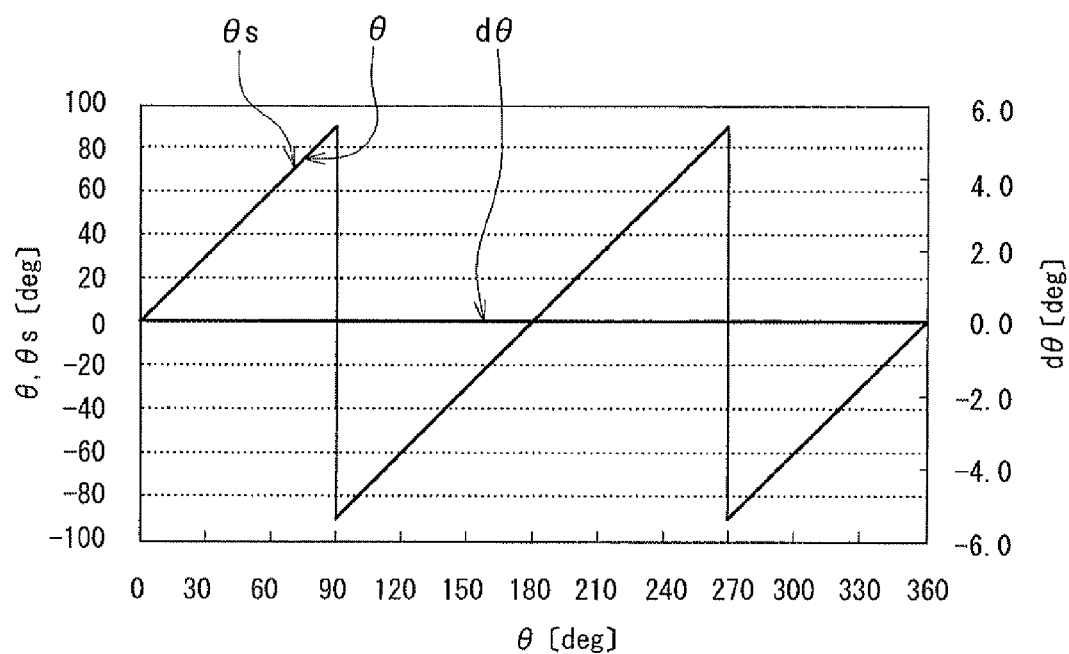
FIG. 35 is a waveform chart showing the relationship between a detected angle value and an angular error in the eighth embodiment of the invention.

FIG. 35 shows the relationship between the detected value θs calculated as described above and an angular error dθ included in the detected value θs. As shown in FIG. 35, the angular error dθ is significantly smaller than the angular errors dθA and dθB. It should be noted that the phase difference between the detected value θAs and the detected value θBs is not limited to ½ of the first error period, and may be any odd number of times ½ of the first error period.

With the operation described above, it is possible according to the present embodiment to reduce both the angular error component that occurs due to the MR elements and the angular error component that occurs due to the external magnetic field.

The other configuration, operation, and effects of the present embodiment are the same as those of the first or fifth embodiment. In the present embodiment, the detection circuits may be configured as in the third or fourth embodiment.

It should be noted that the arrangement of the plurality of detection units in each of the foregoing embodiments is illustrative only. Various modifications may be made to the arrangement of the plurality of detection units as far as the requirements set forth in the claims are met.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A magnetic sensor for detecting an angle that a direction of an external magnetic field in a reference position forms with respect to a reference direction, the external magnetic field rotating in direction, the magnetic sensor comprising:
   a first detection unit for detecting a first angle that the direction of the external magnetic field in a first position forms with respect to a first direction; and
   a second detection unit for detecting a second angle that the direction of the external magnetic field in a second position forms with respect to a second direction, wherein:
   the first detection unit includes first and second detection circuits each of which detects an intensity of a component of the external magnetic field in one direction and outputs a signal indicating the intensity, and a first arithmetic circuit that calculates a first detection angle based on the output signals of the first and second detection circuits, the first detection angle being a detected value of the first angle, the output signal of the first detection circuit and the output signal of the second detection circuit differing in phase by an odd number of times ¼ of a period of the output signals of the first and second detection circuits;
   the second detection unit includes third and fourth detection circuits each of which detects an intensity of a component of the external magnetic field in one direction and outputs a signal indicating the intensity, and a second arithmetic circuit that calculates a second detection angle based on the output signals of the third and fourth detection circuits, the second detection angle being a detected value of the second angle, the output signal of the third detection circuit and the output signal of the fourth detection circuit differing in phase by an odd number of times ¼ of a period of the output signals of the third and fourth detection circuits;
   the first detection angle includes a first angular error with respect to a theoretical value of the first angle that is assumed when the direction of the external magnetic field rotates in an ideal way;
   the second detection angle includes a second angular error with respect to a theoretical value of the second angle that is assumed when the direction of the external magnetic field rotates in an ideal way;
   the first angular error and the second angular error make periodical changes at an equal error period in response to a change of the direction of the external magnetic field, the change of the first angular error depending on a change of the first detection angle, the change of the second angular error depending on a change of the second detection angle; and
   the first detection angle and the second detection angle differ in phase by an odd number of times ½ of the error period,
   the magnetic sensor further comprising a third arithmetic circuit that calculates a detected value of the angle that the direction of the external magnetic field in the reference position forms with respect to the reference direction, based on the first detection angle and the second detection angle.

2. The magnetic sensor according to claim 1, wherein the first position and the second position fall on an identical position in terms of the direction of rotation of the external magnetic field, and the first direction and the second direction differ by a spatial angle equivalent to an odd number of times ½ of the error period in the direction of rotation of the external magnetic field.

3. The magnetic sensor according to claim 1, wherein the first position and the second position are different from each other, and an interval between the first position and the second position is equivalent to an odd number of times ½ of the error period.

4. The magnetic sensor according to claim 1, wherein the output signals of the first to fourth detection circuits are equal in period, and the error period is ¼ of the period of the output signals of the first to fourth detection circuits.

5. The magnetic sensor according to claim 1, wherein each of the first to fourth detection circuits includes a pair of magnetic detection elements connected in series.

6. The magnetic sensor according to claim 5, wherein each of the first to fourth detection circuits has a Wheatstone bridge circuit that includes a first pair of magnetic detection elements connected in series and a second pair of magnetic detection elements connected in series.

7. The magnetic sensor according to claim 5, wherein the magnetic detection elements are magnetoresistive elements.

8. The magnetic sensor according to claim 7, wherein each of the magnetoresistive elements has a magnetization pinned layer whose direction of magnetization is pinned, a free layer whose direction of magnetization varies with the direction of the external magnetic field, and a nonmagnetic layer disposed between the magnetization pinned layer and the free layer.

9. The magnetic sensor according to claim 8, wherein:
   the directions of magnetization of the magnetization pinned layers of the magnetoresistive elements in the second detection circuit are orthogonal to those of the magnetization pinned layers of the magnetoresistive elements in the first detection circuit; and
   the directions of magnetization of the magnetization pinned layers of the magnetoresistive elements in the fourth detection circuit are orthogonal to those of the magnetization pinned layers of the magnetoresistive elements in the third detection circuit.

10. A magnetic sensor for detecting an angle that a direction of an external magnetic field in a reference position forms with respect to a reference direction, the external magnetic field rotating in direction, the magnetic sensor comprising:
   a first detection unit for detecting a first angle that the direction of the external magnetic field in a first position forms with respect to a first direction; and
   a second detection unit for detecting a second angle that the direction of the external magnetic field in a second position forms with respect to a second direction, wherein:

the first detection unit includes first and second detection circuits each of which detects an intensity of a component of the external magnetic field in one direction and outputs a signal indicating the intensity, and a first arithmetic circuit that calculates a first detection angle based on the output signals of the first and second detection circuits, the first detection angle being a detected value of the first angle, the output signal of the first detection circuit and the output signal of the second detection circuit differing in phase by an odd number of times ¼ of a period of the output signals of the first and second detection circuits;

the second detection unit includes third and fourth detection circuits each of which detects an intensity of a component of the external magnetic field in one direction and outputs a signal indicating the intensity, and a second arithmetic circuit that calculates a second detection angle based on the output signals of the third and fourth detection circuits, the second detection angle being a detected value of the second angle, the output signal of the third detection circuit and the output signal of the fourth detection circuit differing in phase by an odd number of times ¼ of a period of the output signals of the third and fourth detection circuits;

the first detection angle includes a first angular error with respect to a theoretical value of the first angle that is assumed when the direction of the external magnetic field rotates in an ideal way;

the second detection angle includes a second angular error with respect to a theoretical value of the second angle that is assumed when the direction of the external magnetic field rotates in an ideal way;

the first angular error and the second angular error make periodical changes at an equal error period in response to a change of the direction of the external magnetic field, the change of the first angular error and the change of the second angular error depending on the change of the direction of the external magnetic field; and the first position and the second position are different from each other, and an interval between the first position and the second position is equivalent to an odd number of times ½ of the error period, the magnetic sensor further comprising a third arithmetic circuit that calculates a detected value of the angle that the direction of the external magnetic field in the reference position forms with respect to the reference direction, based on the first detection angle and the second detection angle.

11. The magnetic sensor according to claim 10, wherein the error period is one half period of the rotation of the direction of the external magnetic field.

12. The magnetic sensor according to claim 10, wherein each of the first to fourth detection circuits includes a pair of magnetic detection elements connected in series.

13. The magnetic sensor according to claim 12, wherein each of the first to fourth detection circuits has a Wheatstone bridge circuit that includes a first pair of magnetic detection elements connected in series and a second pair of magnetic detection elements connected in series.

14. The magnetic sensor according to claim 12, wherein the magnetic detection elements are magnetoresistive elements.

15. The magnetic sensor according to claim 14, wherein each of the magnetoresistive elements has a magnetization pinned layer whose direction of magnetization is pinned, a free layer whose direction of magnetization varies with the direction of the external magnetic field, and a nonmagnetic layer disposed between the magnetization pinned layer and the free layer.

16. The magnetic sensor according to claim 15, wherein:
the directions of magnetization of the magnetization pinned layers of the magnetoresistive elements in the second detection circuit are orthogonal to those of the magnetization pinned layers of the magnetoresistive elements in the first detection circuit; and
the directions of magnetization of the magnetization pinned layers of the magnetoresistive elements in the fourth detection circuit are orthogonal to those of the magnetization pinned layers of the magnetoresistive elements in the third detection circuit.

17. The magnetic sensor according to claim 10, wherein:
the first angular error includes a component that changes at the error period depending on the change of the direction of the external magnetic field, and a component that changes at a second error period depending on a change of the first detection angle;
the second angular error includes a component that changes at the error period depending on the change of the direction of the external magnetic field, and a component that changes at the second error period depending on a change of the second detection angle; and
the first detection angle and the second detection angle differ in phase by an odd number of times ½ of the second error period.

* * * * *